(12) United States Patent
Yun et al.

(10) Patent No.: US 8,396,906 B2
(45) Date of Patent: Mar. 12, 2013

(54) METADATA STRUCTURE FOR STORING AND PLAYING STEREOSCOPIC DATA, AND METHOD FOR STORING STEREOSCOPIC CONTENT FILE USING THIS METADATA

(75) Inventors: Kug-Jin Yun, Daejon (KR); Suk-Hee Cho, Daejon (KR); Namho Hur, Daejon (KR); Jin-Woong Kim, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 28 days.

(21) Appl. No.: 12/682,401

(22) PCT Filed: Jun. 19, 2008

(86) PCT No.: PCT/KR2008/003482
§ 371 (c)(1),
(2), (4) Date: Apr. 9, 2010

(87) PCT Pub. No.: WO2009/048216
PCT Pub. Date: Apr. 16, 2009

(65) Prior Publication Data
US 2010/0217785 A1    Aug. 26, 2010

(30) Foreign Application Priority Data

| Oct. 10, 2007 | (KR) | 10-2007-0101964 |
| Nov. 22, 2007 | (KR) | 10-2007-0119740 |
| Nov. 29, 2007 | (KR) | 10-2007-0122945 |
| Dec. 18, 2007 | (KR) | 10-2007-0133764 |
| Feb. 22, 2008 | (KR) | 10-2008-0016280 |

(51) Int. Cl.
*G06F 17/30* (2006.01)

(52) U.S. Cl. ........ 707/821; 386/265; 386/326; 382/154; 348/42; 348/51

(58) Field of Classification Search .................. 707/821; 386/95, 329, 265, 326; 382/154; 348/42, 348/51
See application file for complete search history.

(56) References Cited

U.S. PATENT DOCUMENTS

| 6,574,423 | B1 * | 6/2003 | Oshima et al. ................. 386/329 |
| 7,860,907 | B2 * | 12/2010 | Worrall .......................... 707/821 |
| 2001/0033619 | A1 * | 10/2001 | Hanamura et al. ........ 375/240.26 |
| 2001/0038413 | A1 | 11/2001 | Peleg et al. |
| 2003/0031467 | A1 * | 2/2003 | Ando et al. ...................... 386/95 |
| 2003/0095177 | A1 | 5/2003 | Yun et al. |
| 2003/0156188 | A1 * | 8/2003 | Abrams, Jr. .................... 348/51 |

(Continued)

FOREIGN PATENT DOCUMENTS

| JP | 2005-026800 A | 1/2005 |
| JP | 2005-094168   | 4/2005 |

(Continued)

OTHER PUBLICATIONS

International Search Report: PCT/KR2008/003482.

*Primary Examiner* — Hanh Thai
(74) *Attorney, Agent, or Firm* — NSIP Law

(57) ABSTRACT

Provided is a metadata structure for storing and re-producing stereoscopic data and a method for storing a stereoscopic content file based on the metadata structure. The stereoscopic content file storing method includes storing streams of the stereoscopic contents; and, when the stereoscopic content has more than two elementary streams, storing information for dividing the elementary streams into a main track and a supplementary track.

14 Claims, 17 Drawing Sheets

U.S. PATENT DOCUMENTS

| | | | |
|---|---|---|---|
| 2003/0156649 A1* | 8/2003 | Abrams, Jr. | 375/240.24 |
| 2003/0163480 A1 | 8/2003 | Takahashi et al. | |
| 2004/0078357 A1* | 4/2004 | LaChapelle et al. | 707/2 |
| 2006/0221178 A1 | 10/2006 | Yun et al. | |
| 2006/0244013 A1 | 11/2006 | Matsunaga et al. | |
| 2006/0245729 A1* | 11/2006 | Itoh et al. | 386/96 |
| 2008/0170118 A1* | 7/2008 | Albertson et al. | 348/46 |
| 2008/0170123 A1* | 7/2008 | Albertson et al. | 348/157 |
| 2008/0170748 A1* | 7/2008 | Albertson et al. | 382/103 |
| 2008/0170749 A1* | 7/2008 | Albertson et al. | 382/103 |
| 2008/0170776 A1* | 7/2008 | Albertson et al. | 382/154 |
| 2008/0172261 A1* | 7/2008 | Albertson et al. | 705/7 |
| 2010/0165077 A1* | 7/2010 | Yin et al. | 348/42 |
| 2010/0182403 A1 | 7/2010 | Chun et al. | |

FOREIGN PATENT DOCUMENTS

| | | |
|---|---|---|
| JP | 2006-013759 A | 1/2006 |
| KR | 1020060100258 A | 9/2006 |
| KR | 100716142 B1 | 5/2007 |
| KR | 1020070061227 A | 6/2007 |
| WO | WO-03/092304 A1 | 11/2003 |

* cited by examiner (a)

(b)

(a)

(b)

(a)

(b)

(a)

(b)

(a)

(b)

| else if (payloadType == 21) | | |
|---|---|---|
| stereo_video_info (payloadSize) | 5 | |
| else | | |
| reserved_sel_message (payloadSize) | 5 | |

(a)

(b)

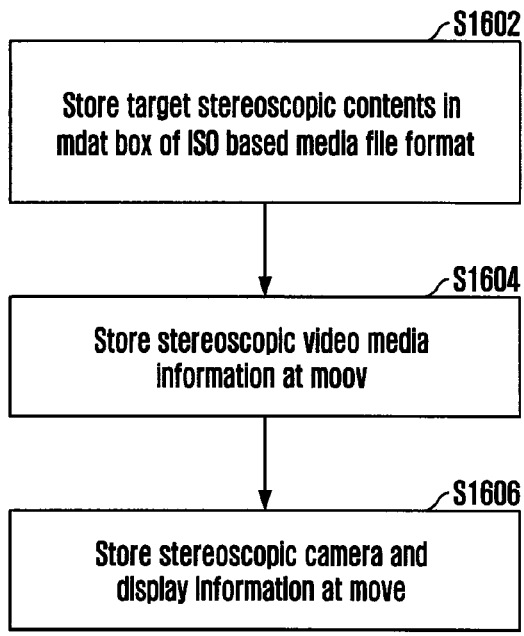
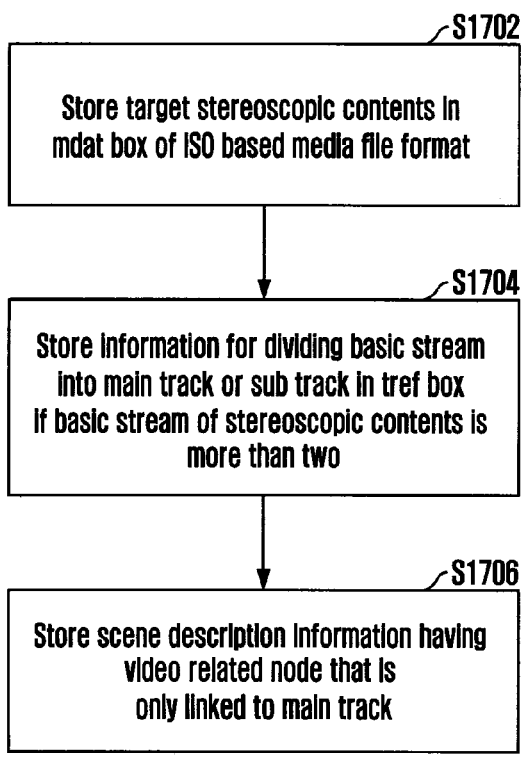

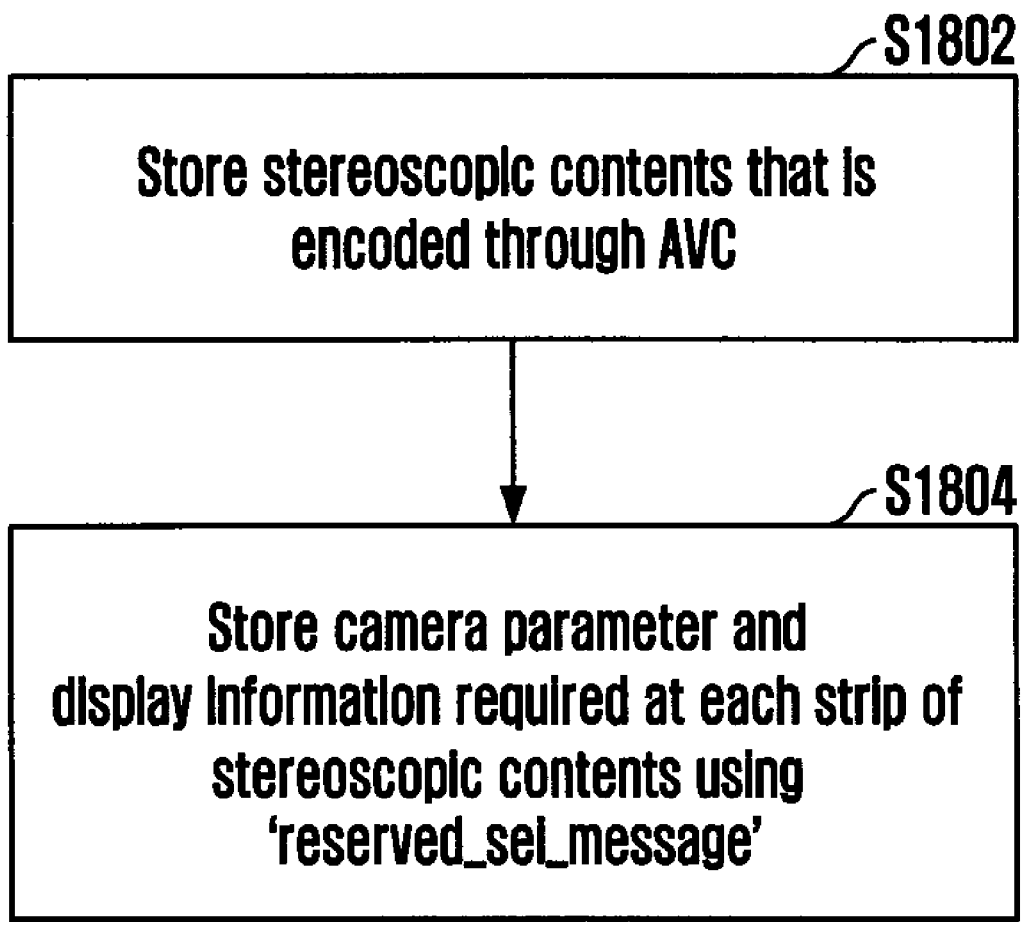

METADATA STRUCTURE FOR STORING AND PLAYING STEREOSCOPIC DATA, AND METHOD FOR STORING STEREOSCOPIC CONTENT FILE USING THIS METADATA

TECHNICAL FIELD

The present invention relates to a metadata structure for storing and reproducing stereoscopic data and a method for storing a stereoscopic content file using the same; and, more particularly, to a metadata structure (control information) required when two dimensional (2D) and three dimensional (3D) contents are provided together, and a method for storing a stereoscopic contents file using the same.

This work was supported by the IT R&D program of MIC/IITA [2005-S-403-02, "Development of Super-intelligent Multimedia Anytime-anywhere Realistic TV (SmarTV) Technology"].

BACKGROUND ART

A market of application services using stereoscopic contents and related devices has been formed domestically and internationally based on a mobile phone, a digital camera, a digital video disk (DVD), and a PDP. Accordingly, there has been a demand for defining a standard for system information or control information (metadata) for capturing, storing, and reproducing stereoscopic contents and a file format including the same.

Korea Patent Publication No. 2006-0056070, entitled "Apparatus and method for processing 3D moving images using MPEG-4 object descriptor and structure" (hereinafter, referred to as a first patent) disclosed a 3D moving image object descriptor having new information such as a type of a 3D moving image, various display types, and viewpoints. Korea Patent Application No. 2006-0100258, entitled method for transmitting stereoscopic image data; hereinafter: second patent) disclosed a file format including a video data unit including stereoscopic image information and a header unit including metadata for decoding and reproducing stereoscopic image information as a file format for data of video decoded for stereoscopic contents.

However, the first and second patents fail to introduce a method for identifying contents when 2D contents or 3D contents are organized and provided together (that is, when 2D contents and 3D contents are used together), a method for providing stereoscopic camera and display information when 3D contents have different stereoscopic camera and display information, and stereoscopic track reference information when 3D contents formed of two elementary streams.

DISCLOSURE

Technical Problem

An embodiment of the present invention is directed to providing a method for storing stereoscopic contents.

Another embodiment of the present invention is directed to providing a method for storing stereoscopic contents by identifying 2D contents and 3D contents when downloading and reproducing 2D contents and 3D contents in various 3D terminal environments and displaying the identified 2D contents and 3D contents through automatically turning On/Off a parallax barrier.

Still another embodiment of the present invention is directed to providing a method for storing stereoscopic camera/display information when stereoscopic contents have different stereoscopic camera and display information by fragments.

Yet another embodiment of the present invention is directed to providing a method for storing stereoscopic contents for identifying main/sub tracks when stereoscopic contents have two elementary streams and removing redundancy of stereoscopic camera/display information that is included and used in each track while sustaining comparability with at typical 2D terminal Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for storing stereoscopic contents, which includes: storing streams of the stereoscopic contents; and when the stereoscopic contents have more than two elementary streams, storing information for dividing the elementary streams into a main track and a supplementary track.

In accordance with another aspect of the present invention, there is provided a file format structure for storing stereoscopic contents, which includes: a media data box for storing streams of the stereoscopic contents; and a track reference box for when the stereoscopic contents include more than two elementary streams, storing information dividing the elementary streams into a main track and a supplementary track.

In accordance with another aspect of the present invention, there is provided a method for storing stereoscopic contents based on Advanced Video Codec (AVC) Supplemental Enhancement Information (SEI), which includes: storing stereoscopic contents encoded based on AVC, wherein 'stereo video information SEI' includes information indicating that stereoscopic video is of a 'side by side' type.

Advantageous Effects

According to the present invention, a stereoscopic content formed of a 2D content and a 3D content can be conveniently stored and provided. A user is enabled to conveniently enjoy stereoscopic contents by automatically change parallax barrier to 2D or 3D display through 2D contents and 3D contents delimiter information.

BRIEF DESCRIPTION OF THE DRAWINGS

In FIG. 6, a diagram a) shows a format for 3D contents formed of one source and a diagram b) shows a format for 3D contents formed of two sources.

In FIG. 7, a diagram a) shows 3D contents formed of one source, and a diagram b) shows 3D contents formed of two sources.

In FIG. 8, diagram a) shows 3D contents formed of one source and a diagram b) shows 3D contents formed of two sources.

In FIG. 9, a diagram a) shows a format including an 'ishd' box and LASer included in a 'moov' box, a diagram b) shows a format having an 'ishd' box included in a 'moov' box and having LASeR included in a 'mdat' box, and a diagram c) having 'ishd' and LASeR included in a 'meta' box.

FIG. 16 is a flowchart illustrating a method for storing stereoscopic contents in accordance with an embodiment of the present invention.

FIG. 17 is a flowchart illustrating a method for storing stereoscopic contents in accordance with another embodiment of the present invention.

FIG. 18 is a flowchart illustrating a method for storing stereoscopic contents in accordance with still another embodiment of the present invention.

BEST MODE FOR THE INVENTION

Figure 1:
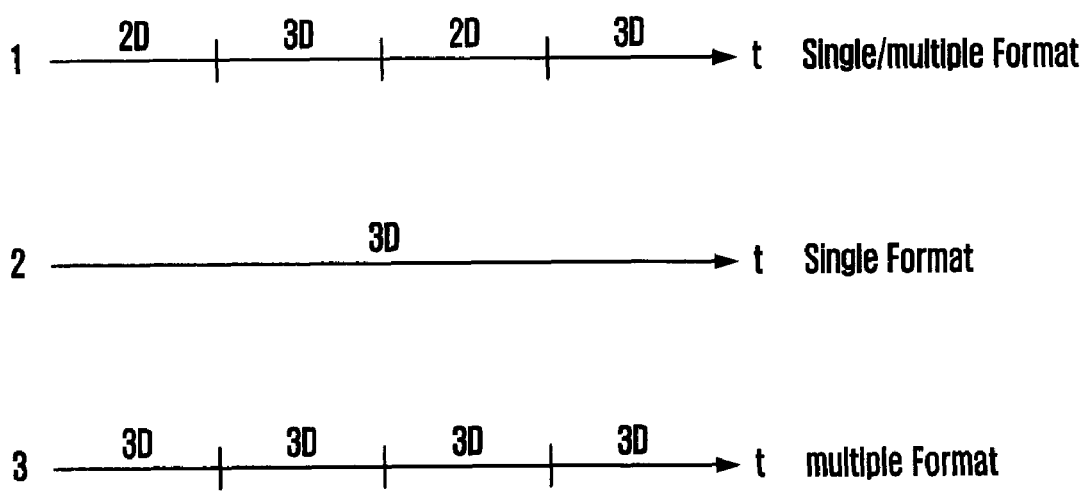
FIG. 1 is a diagram illustrating various contents configuration types for providing stereoscopic contents.
Figure 1:
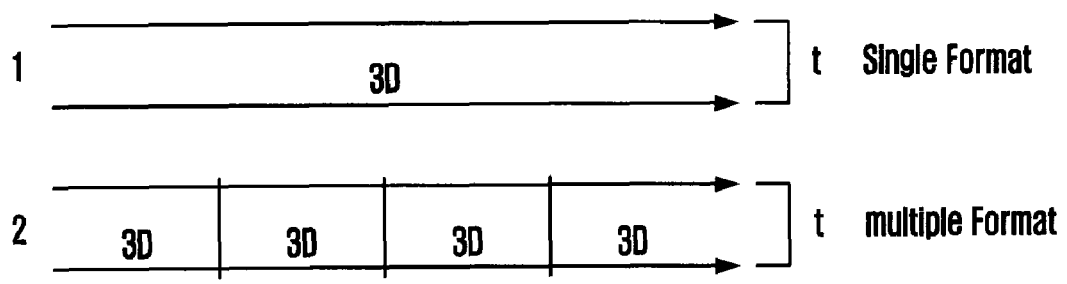

FIG. 1 illustrates various configurations of contents for providing stereoscopic contents. A diagram a) of FIG. 1 shows formats for contents having one elementary stream ES (ES=1), and a diagram b) of FIG. 1 shows formats for contents having two elementary streams ES (ES=2). A single format is a format for contents when a stereoscopic image forming scheme is same and when only one camera parameter and one display information is included. A multiple format is a format when stereoscopic image forming scheme is different, when a camera parameter is different although the stereoscopic image forming scheme is same, or when a plurality of display information or another information is included.

Stereoscopic contents types includes i) stereoscopic video content such as binocular 3D video service, ii) stereoscopic image content such as binocular 3D still image service (For example: slide show), combination of 2D (mono) video and 3D data service (predetermined scene or part), iii) monoscopic and stereoscopic mixed content such as combination of 2D (mono) video and 3D video (predetermined scene or part).

Figure 2:
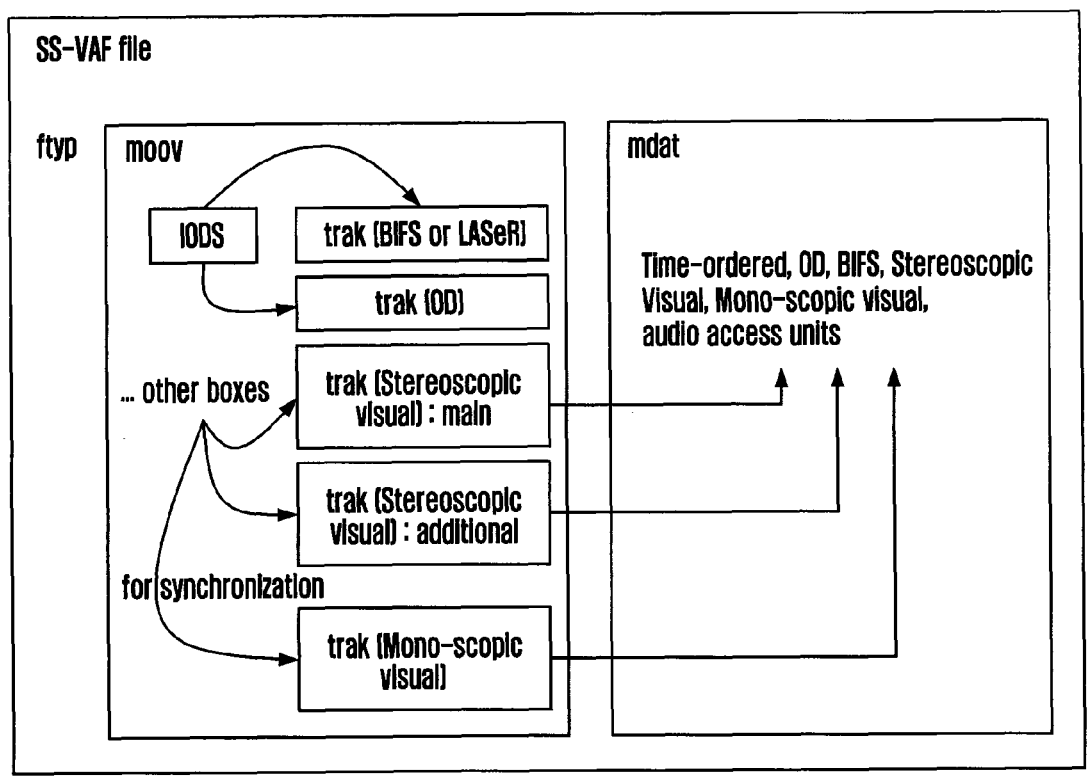
FIG. 2 is a diagram illustrating a basic file format for a stereoscopic video application format in accordance with an embodiment of the present invention when MPEG-4 system information is present.
Figure 3:
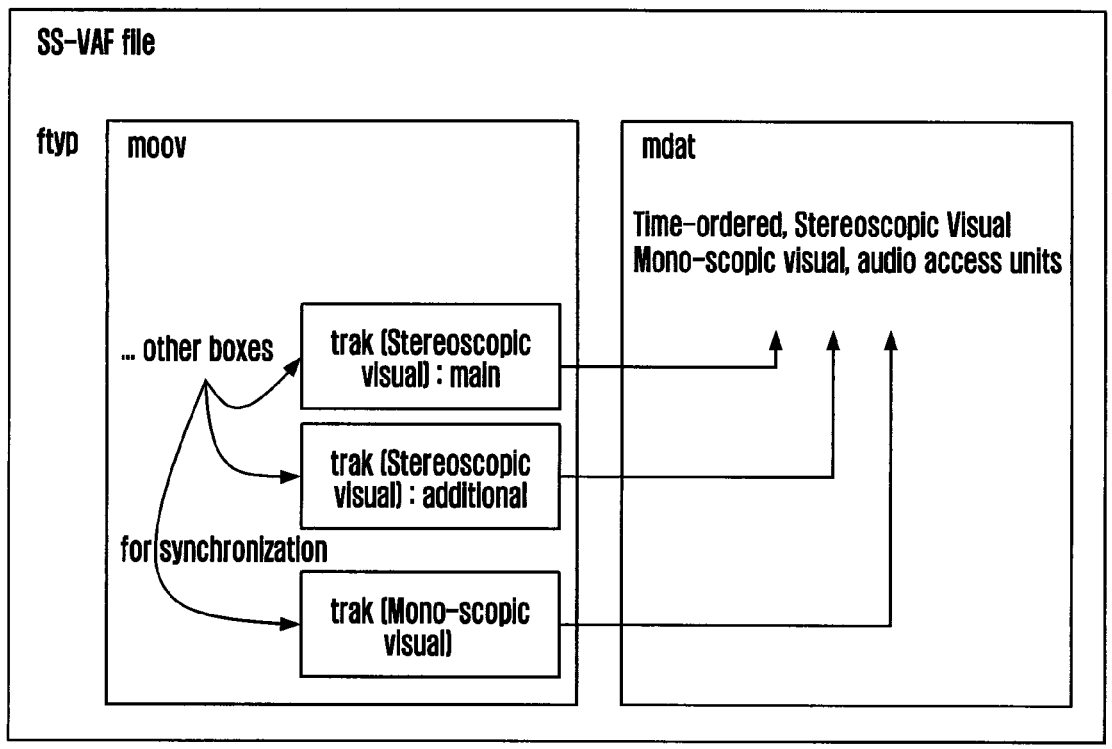
FIG. 3 is a diagram illustrating a basic file format for a stereoscopic video application format in accordance with an embodiment of the present invention when MPEG-4 system information is not present.

FIGS. 2 and 3 show a basic structure of a stereoscopic video application format (SS-VAF) in accordance with an embodiment of the present invention.

FIG. 2 is a file format structure including MPEG-4 system information and FIG. 3 is a file format structure not including MPEG-4 system information. As shown, the SS-VAF includes an 'ftyp' box, a 'moov' box, and an 'mdat' box. Hereinafter, syntax and semantics of the boxes of the SS-VAF will be described. The boxes according to the present embodiment are included in the structure of the SS-VAF, locations thereof may be changed according to the types thereof, and information included in the boxes may be used independently.

1. 'scty' (Stereoscopic Content Type)

A 'scty' denotes a basic type of contents. That is, contents are classified into a monoscopic content or a stereoscopic content by the 'scty'. Here, the monoscopoic content means a general 2D image. Table 1 shows the syntax of the 'scty'. A 'Stereoscopic_Content_Type' in the 'scty' may be include in the 'ftyp' box or another boxes.

TABLE 1

Aligned(8) class StereoscopicContentTypeBox extend Box('sfty')
{
unsigned int(2)  Stereoscopic_Content_Type:
       unsigned int(6)  reserved;
}

In Table 1, the 'Stereoscopic_Content_Type' denotes a stereoscopic content type and has a meaning of Table 2.

TABLE 2

| Value | Description |
|---|---|
| 00 | Stereoscopic Content(3D) |
| 01 | Mono/stereoscopic Mixed Contents(2D + 3D) |
| 10~11 | Reserved |

2. 'sovf' (Stereoscopic Object Visual Format)

A 'sovf' denotes an image configuration format of a stereoscopic content (or visual format). Table 3 shows the syntax of the 'sovf'. The 'sovf' includes a 'Stereoscoic_Object_VisualFormat'. The 'Stereoscopic_Object_VisualFormat' may be included in typical other boxes or a box that is newly defined for storing stereoscopic content.

TABLE 3

Aligned(8) class StereoscopicObjectDataVisualFormat extend Box('sovf')
{
       unsigned TABLE 3-continued

```
    int(4)    Stereoscopic_Object_VisualFormat:
             unsigned int(4)    reserved;
}
```

In Table 3, the 'Stereoscopic_Object_VisualFormat' denotes the image configuration information of a stereoscopic content and has meaning of Table 4.

TABLE 4

| Value | Description |
|---|---|
| 0000 | Side by Side |
| 0001 | Top-Down |
| 0010 | Field Sequential based on horizontal |
| 0011 | Field Sequential based on vertical |
| 0100 | Frame Sequential |
| 0101~0111 | Reserved |
| 1000 | Main + additional (full size) |
| 1001 | Main + additional (half of vertical) |
| 1010 | Main + additional (half of horizontal) |
| 1011 | Main + additional (half of vertical/horizontal) |
| 1100 | Main + depth Map |

In Table 4, 'full size' means that a size of a supplementary image is identical to a size of a main image. 'half of vertical' denotes that a size of a supplementary image is vertically half a size of a main image. 'half of horizontal' denotes that a size of a supplementary image is horizontally half a size of a main image. 'half of vertical/horizontal' means that a size of a supplementary image is horizontally and vertically half a size of a main image.

3. 'ssci'(Stereoscopic Content Information)

A 'ssci' denotes information on minimum/maximum depth or disparity of a stereoscopic content. The 'ssci' enables a 3D terminal to reproduce a 3D image proper for 3D display. Table 5 denotes the syntax of the 'ssci'. The minimum/maximum depth information included in the 'ssci' may be included in other typical boxes or a box that is newly defined for storing stereoscopic contents. In Table 5, a 'Max_of_depth(disparity)' denotes maximum depth/disparity information (pixel unit), and a 'Min_of_depth(disparity)' denotes minimum depth/disparity information (pixel unit).

TABLE 5

```
    Aligned(8)    class    StereoscopicObjectContentInformation
    extend Box('ssci') {
             unsigned int(32) Max_of_depth or disparity;
             unsigned int(32) Min_of_depth or disparity;
}
```

4. 'scpi'(Stereoscopic Camera Parameter Information)

A 'scpi' denotes camera parameter information of a stereoscopic content that is captured by a stereoscopic camera or is created by a related tool. Table 6 shows the syntax of the 'scpi'. Also, each field included in the 'scpi' may be included in other typical boxes or a box that is newly defined for storing stereoscopic content.

TABLE 6

```
    Aligned(8)    class    StereoscopicCameraParameterInformation
    extend Box('scpi') {
             unsigned int(32) Baseline;
             unsigned int(32) Focal_Length;
             unsigned int(32) Convergence_point_distnace;
```

TABLE 6-continued

```
             unsigned int(1)    StereoscopicCamera_setting;
             unsigned int(7)    Reserved;
}
```

In Table 6, a 'Baseline' denotes a distance between a left camera and a right camera, a 'Focal_Length' means a distance between an image plane (CCD sensor) and a camera center, and a 'Convergence_point_distance' denotes a distance between a convergence pint and a baseline. Here, the convergence point means a crossing of visual lines of a left camera and a right camera. A 'StereoscopicCamera_setting' denotes the camera arrangement of stereoscopic photographing/data and has meaning of Table 7.

TABLE 7

| Value | Description |
|---|---|
| 0 | Parallel arrangement |
| 1 | Cross arrangement |

5. 'iods' (Object Descriptor Box)

A 'iods' denotes information on an initial object descriptor (TOD) for representing a location of a BIFS stream or an OD stream when scene information such as BIFS or LASeR is included. Table 8 shows the syntax of the 'iods'.

TABLE 8

```
    Aligned(8) class ObjectDescriptoratBox extend Box('iods')
    {
             ObjectDescriptor OD;
    }
```

6. 'soet' (Stereoscopic One ES Type Box)

A 'soet' denotes a type of an elementary stream (ES) when an encoder outputs one ES. Table 9 shows the syntax of the 'soet'.

TABLE 9

```
    Aligned(8)    class    StereoscopicOnesTypeBox    extend
    Box('soet') {
             unsigned int(3)    Stereoscopic_OneES_Type:
             unsigned int(5)    Rreserved;
    }
```

In Table 9, a 'Stereoscopic_OneES_Type' denotes an embodiment of an image configuration format of stereoscopic data formed of one ES and has a meaning of Table 10.

TABLE 10

| Value | Description |
|---|---|
| 000 | Side by Side |
| 001 | Top-Down |
| 010 | Field Sequential based on horizontal |
| 011 | Field Sequential based on vertical |
| 100 | Frame Sequential |
| 101 | Mono/stereoscopic Mixed data |
| 110 | Reference image/stereoscopic data formed based on supplementary data |
| 111 | Reserved |

7. 'stet' (StereoScopic Two ES Type Box)

A 'stet' denotes a type of each elementary stream (ES) when an encoder outputs two ESs. Table 11 denotes the syntax of the 'stet'.

TABLE 11

```
Aligned(8)  class  StereoscopicTwoesTypeBox  extend
Box('stet') {
    unsigned int(2)  Stereoscopic_TwoES_Type:
}
```

In Table 11, a 'Stereoscopic_TwoES_Type' denotes an embodiment of an image configuration format of stereoscopic data formed of two ESs and has a meaning of Table 12.

TABLE 12

| Value | Description |
|---|---|
| 000 | Reference image |
| 001 | Supplementary data(image having same size of reference image) |
| 010 | Supplementary data (image having a vertically half size of reference image) |
| 011 | Supplementary data (image having a horizontally half size of reference image) |
| 100 | Supplementary data (image having a horizontally and vertically half size of reference image) |
| 101 | Supplementary data(Depth map) |
| 110 | Supplementary data(Disparity map) |
| 111 | Reserved |

8. 'sstt' (StereoScopic Time Table Box)

A 'sstt' denotes information on beginning and ending of monoscopic contents and stereoscopic contents in a scene when the monoscopic contents and the stereoscopic contents are used together. Table 13 shows the syntax of the 'sstt' according to a first embodiment of the present invention. Each field of the 'sstt' may be included in other typical boxes or a box that is newly defined for storing stereoscopic contents.

TABLE 13

```
Aligned(8)  class  StereoscopicTimeTable  Box  extend
Box('sstt') {
    int i;
    unsigned int(8) Mono/stereoscopic_Scene_count;
    for(i=0;i<=Mono/stereoscopic_Scene_count;i++)
    {
        unsigned int(4) Mono/stereoscopic_identifier;
        unsigned int(4) Reserved;
        unsigned int(32) Start_Time;
    }
}
```

In Table 13, a 'Mono/stereoscopic_Scene_count' denotes the number of mono/stereoscopic scene changes when a stereoscopic content is formed of 2D contents and 3D contents together. That is, the 'Mono/stereoscopic_Scene_count' is set to 2 if a stereoscopic content is formed of 2D→3D→2D. Also, the 'Mono/stereoscopic_Scene_count' is set to 2 if a stereoscopic content is formed of 3D contents only without having 2D contents. Such information may be used for 2D/3D display auto change in a 3D terminal.

A 'Mono/stereoscopic_identifier' denotes a content type by a time and has meanings of Table 14. Also, a 'Mono/stereoscopic_identifier' may be used to identify 2D contents or 3D contents. For example, 1-bit is allocated to the 'Mono/stereoscopic_identifier'. If the Mono/stereoscopic_identifier' is '0', the Mono/stereoscopic_identifier' denotes the 2D contents. If the Mono/stereoscopic_identifier' is '1', the Mono/stereoscopic_identifier' denotes the 3D contents. A 'Start_Time' denotes a contents beginning time by time.

TABLE 14

| Value | Description |
|---|---|
| 0000 | Monoscopic |
| 0001 | Side by Side |
| 0010 | Top-Down |
| 0011 | Field Sequential based on horizontal |
| 0100 | Field Sequential based on vertical |
| 0101 | Frame Sequential |
| 0110~0111 | Reserved |
| 1000 | Main + additional (full size) |
| 1001 | Main + additional (half of vertical) |
| 1010 | Main + additional (half of horizontal) |
| 1011 | Main + additional (half of vertical/horizontal) |
| 1100 | Main + Depth Map |
| 1101 | Main + Disparity Map |

Table 15 shows the syntax of the 'sstt' according to a second embodiment of the present invention. In Table 15, a 'Start_Time' denotes a beginning time of stereoscopic contents, and a 'End_Time' denotes an ending time of stereoscopic contents.

TABLE 15

```
Aligned(8)  class  StereoscopicTimeTable  Box  extend
Box('sstt') {
    int i;
    unsigned int(8) Stereoscopic_Scene_count;
    for(i=0;i<=Stereoscopic_Scene_count;i++)
    {
        unsigned int(32) Start_Time;
        unsigned int(32) End_Time;
    }
}
```

Table 16 shows the syntax of the 'sstt' according to the third embodiment of the present invention. A 'Start_Sample_number' denotes a Mono/Stereoscopic contents beginning sample number or the number of samples. That is, the number of samples denotes the number of entire samples corresponding to monoscopic or stereoscopic. Here, the sample means an individual frame of video and a time-contiguous series of video frames.

TABLE 16

```
Aligned(8)  class  StereoscopicTimeTable  Box  extend
Box('sstt') {
    int i;
    unsigned int(16) Mono/stereoscopic_Scene_count;
    for(i=0;i<=Mono/stereoscopic_Scene_count;i++)
    {
        unsigned int(4) Mono/stereoscopic_identifier;
        unsigned int(32) Start_Sample_number;
    }
}
```

Table 17 shows the syntax of the 'sstt' according to a third embodiment of the present invention.

TABLE 17

```
Aligned(8)  class  StereoscopicTimeTable  Box  extend
Box('sstt') {
    int i;
    unsigned int(8) Stereoscopic_Scene_count;
```

TABLE 17-continued

```
for(i=0;i<=Stereoscopic_Scene_count;i++)
{
    unsinged int(4) Stereoscopic_compositiontype;
    unsigned int(32) Start_sample_number;
    unsigned int(32) End_sample_number;
}
```

In Table 17, a 'Stereoscopic_compositiontype' denotes a content type by a time when it is formed of various stereoscopic configuration types and has meanings of Table 18. An 'End_Sample_number' denotes a stereoscopic content ending sample number or the number of samples.

TABLE 18

| Value | Description |
| --- | --- |
| 0000 | Side by Side |
| 0001 | Top-Down |
| 0010 | Field Sequential based on horizontal |
| 0011 | Field Sequential based on vertical |
| 0100 | Frame Sequential |
| 0101~0111 | Reserved |
| 1000 | Main + additional (full size) |
| 1001 | Main + additional (half of vertical) |
| 1010 | Main + additional (half of horizontal) |
| 1011 | Main + additional (half of vertical/horizontal) |
| 1100 | Main + Depth Map |
| 1101 | Main + Disparity Map |

9. 'sesn' (Stereoscopic ES Num Box)

A 'sesn' denotes the number of elementary streams outputted from an encoder. Table 19 shows the syntax of the 'sesn'. In Table 19, a 'stereoscopic_ESNum' denotes the number of elementary streams outputted from encoding for stereoscopic contents.

TABLE 19

```
Aligned(8) class StereoscopicESNumbBox extend Box('seen')
{
    unsigned int(16) stereoscopic_ESNum;
}
```

10. 'tref' (Track Reference Box)

A 'tref' is a box defined in an ISO based file format that provides information for enabling one track to refer the other track. The 'tref' is included in a 'trak'(Track Box). Table 20 shows the syntax of the 'tref' according to an embodiment of the present invention. Here, a 'track_ID' denotes an identification of a track to be referred. A 'reference_type' has meanings of Table 21.

TABLE 20

```
aligned(8) class TrackReferenceBox extends Box ('tref')
{ }
aligned(8) class TrackReferenceTypeBox (unsigned int(32)
reference_type) extends Box(reference_type) {
    unsigned int(32) track_IDs[ ];
}
```

TABLE 21

| | |
| --- | --- |
| hint | the referenced track(s) contain the original media for this hint track. |
| cdsc | this track describes the referenced track. |
| svdp | this track has a dependency for the referenced track as its primary view track, and it can contain the stereoscopic related 'meta' information for the referenced track. |

A stereoscopic video having two elementary streams (ES) includes two tracks and is connected to two nodes related to a video in LASeR as a scene description like a conventional LASeR. That is, the stereoscopic video having two of ESs are recognized as two objects according to the conventional technology. However, the stereoscopic video is recognized as one object because the stereoscopic video is finally converted into one 3D video format and reproduced in a terminal. That is, although the stereoscopic video is formed using two tracks, the stereoscopic video should be connected using only one node because the stereoscopic vide is converted into one 3D video format to reproduce scenes. If the stereoscopic vide includes two ESs, it is required to have information on relation between two tracks and stereoscopic track reference information is defined at a 'svdp' in the 'tref' as shown in Table 22 and used. Although LASeR is not used, it is required to use stereoscopic track reference information such as a 'svdp' for storing the stereoscopic contents having two of ESs.

If the stereoscopic contents include two elementary streams, the 'tref' enables two tracks to be identified as a main track and an additional track. Also, the 'tref' enables the additional track to refer the main track and stereoscopic video related stereoscopic camera and display information are stored in only one of tracks. Therefore, redundancy of information may be eliminated. Furthermore, one of tracks can be connected to one video node of LASeR although the stereoscopic contents include two tracks.

In the present invention, a structure of an initial stereoscopic header (ishd) is introduced in order to enable stereoscopic contents to support various stereoscopic image configuration formats and camera parameters. Information included in the initial stereoscopic header (ishd) may be independently used according to an embodiment of the present invention.

In case of a stereoscopic stream having various stereoscopic formats and camera parameters, each stereoscopic stream and the beginning and the length of each stereoscopic steam are identified through an 'iloc', and an item_ID is allocated to each fragment. Therefore, the initial stereoscopic header (ishd) must provide information on each stereoscopic format or camera parameter based on the item_ID. Here, an item means one stereoscopic fragment when a stereoscopic stream includes stereoscopic fragments and monoscopic fragments together as one sequence.

If a stereoscopic stream includes three stereoscopic fragments and each of the stereoscopic fragments includes different ishd information, the stereoscopic fragments are identified by the item_ID and descript information thereof. However, if the three stereoscopic fragments have the same ishd information, second and third stereoscopic fragments include a field showing that the second and third stereoscopic fragments include the same ishd information of the first stereoscopic fragment. Such a structure can advantageously remove information redundancy included in the initial stereoscopic header (ishd).

Figure 4:
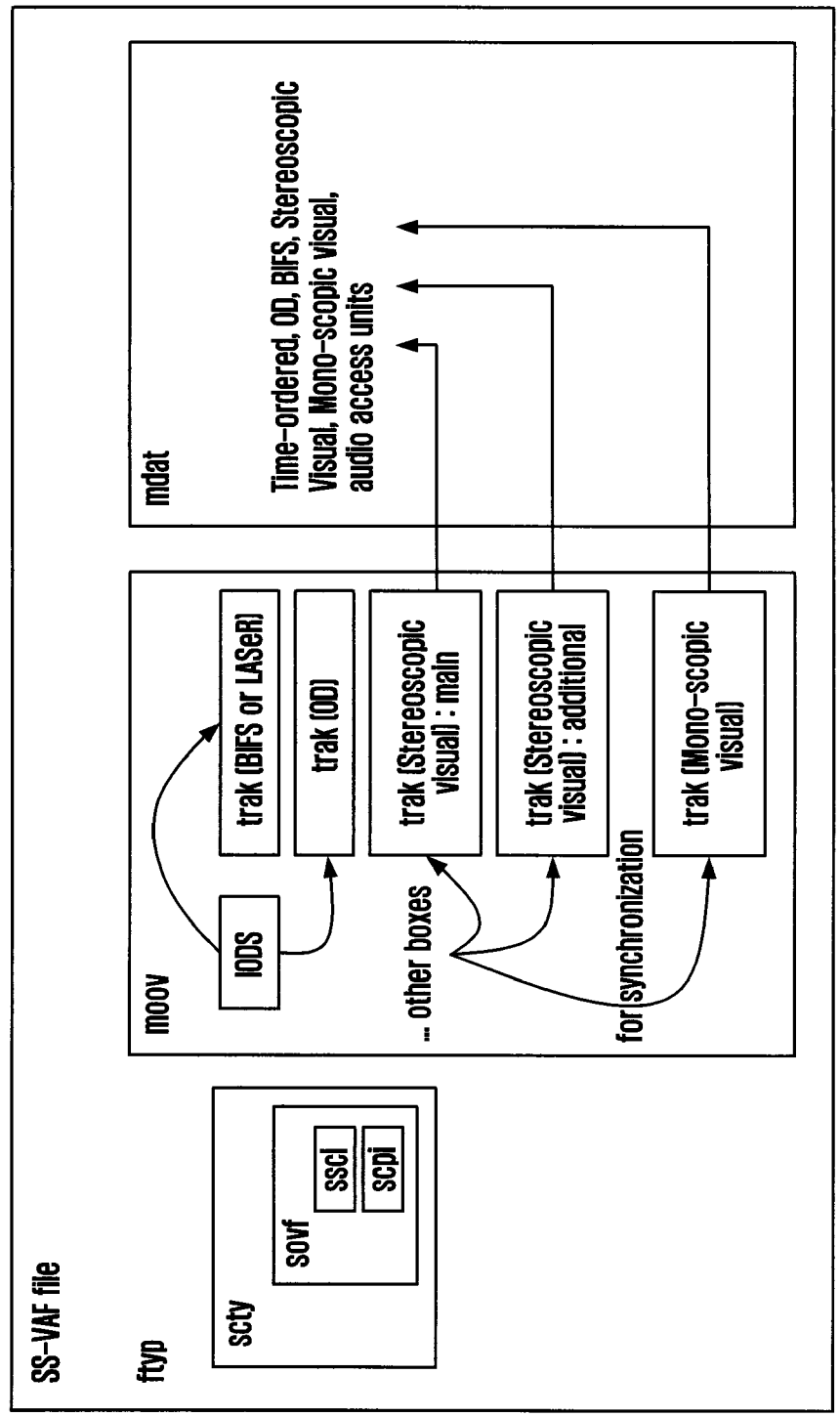
FIG. 4 is a diagram illustrating a stereoscopic video application format in accordance with a first embodiment of the present invention when MPEG-4 system information is present.
Figure 5:
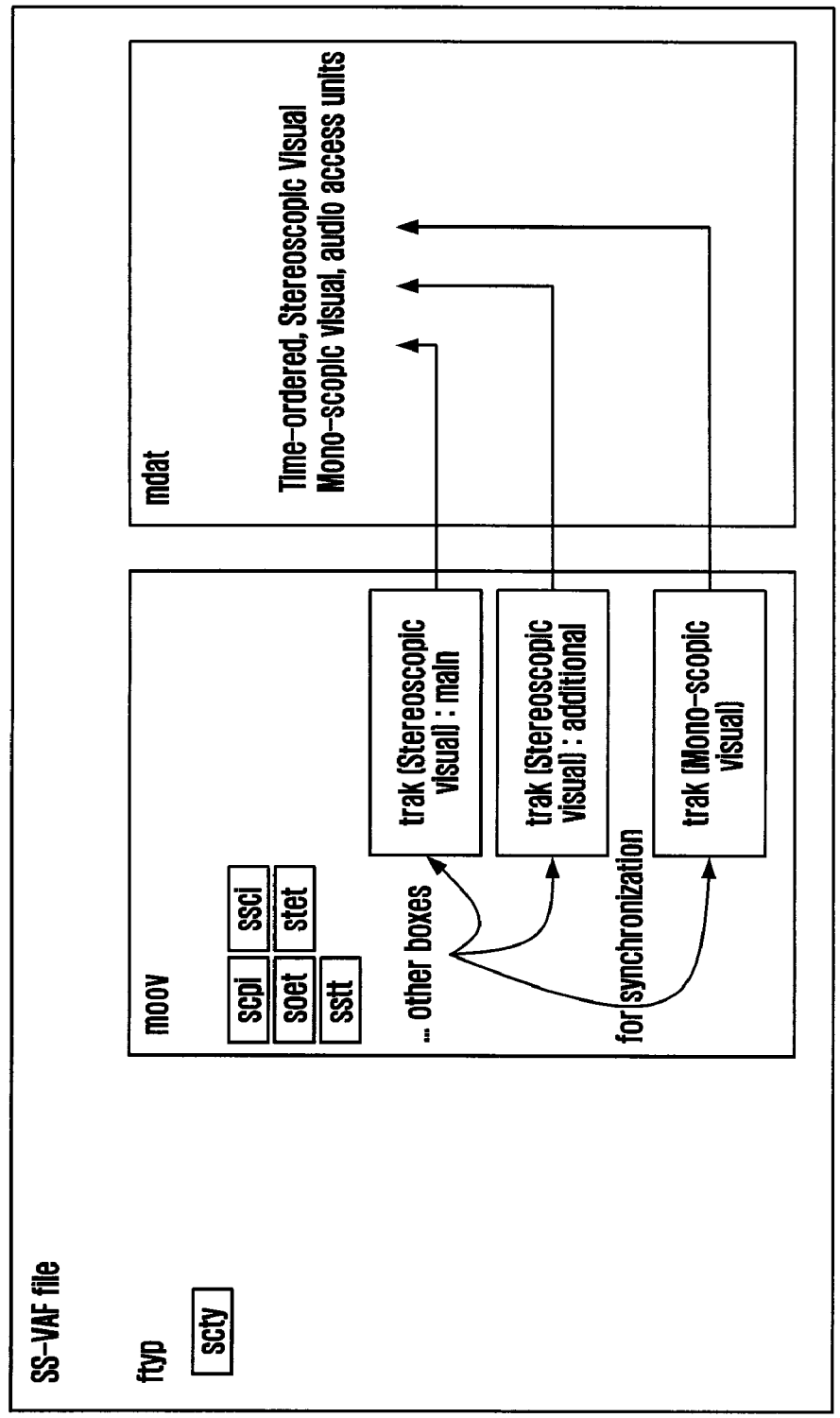
FIG. 5 is a diagram illustrating a stereoscopic video application format in accordance with a first embodiment of the present invention when MPEG-4 system information is not present.

FIG. 4 is a diagram illustrating a stereoscopic video application format (SS-VAF) having MPEG-4 system information in accordance with an embodiment of the present invention, and FIG. 5 is a diagram illustrating a stereoscopic video application format (SS-VAF) not having MPEG-4 system information in accordance with an embodiment of the present invention.

When monoscopic contents and stereoscopic contents are used together, delimiter information is needed to determine when the monoscopic contents or the stereoscopic contents begins or ends. The monoscopic contents and the stereoscopic contents may be identified according to beginning/ending information of the monoscopic/stereoscopic contents, 2D/3D identification of sample, and the number of samples (AU) included therein.

Figure 6:
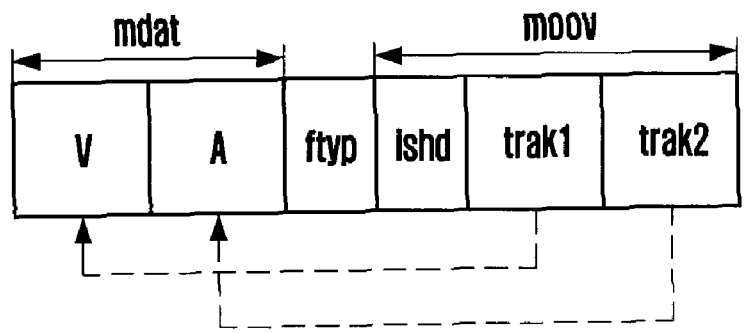
FIG. 6 is a diagram illustrating a storing format having an 'ishd' box included in a 'moov' box in accordance with an embodiment of the present invention.
Figure 6:
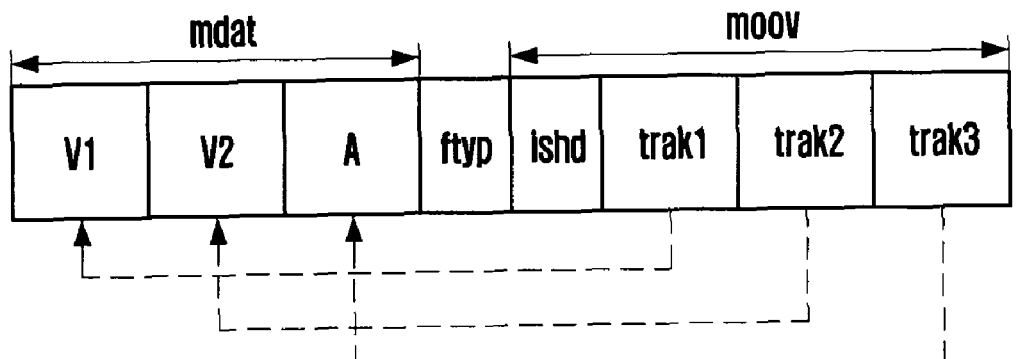
Figure 7:
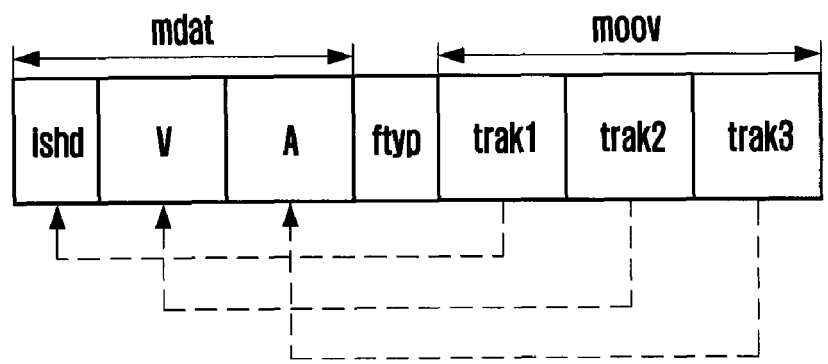
FIG. 7 is a diagram illustrating a storing format having an 'ishd' box included in an 'mdat' box in accordance with an embodiment of the present invention.
Figure 7:
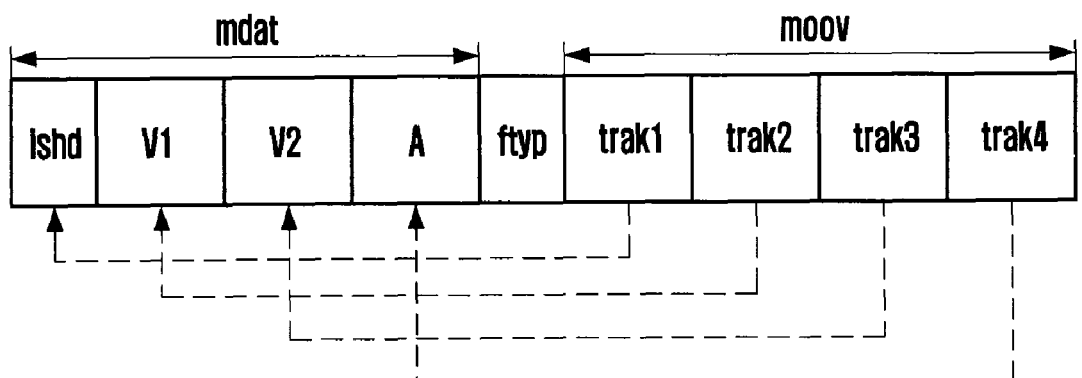
Figure 8:
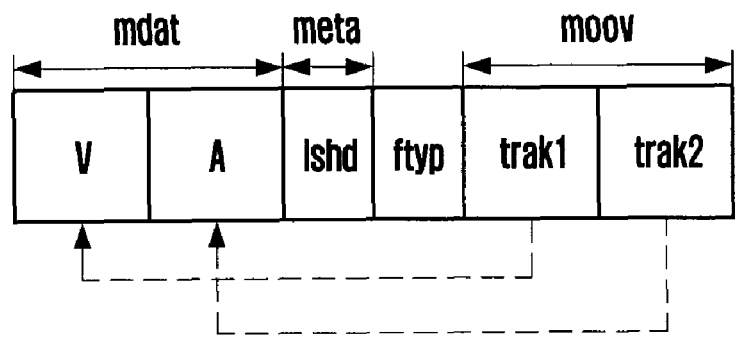
FIG. 8 is a diagram illustrating a storing format including 'ishd' and 'meta' in accordance with an embodiment of the present invention.
Figure 8:
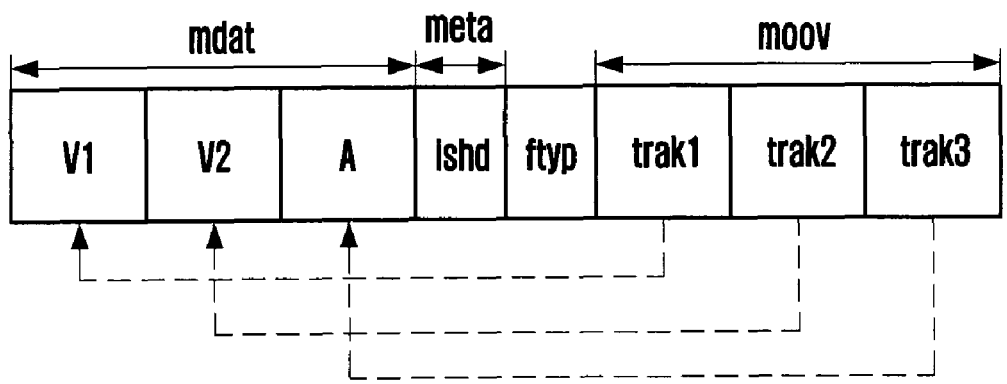

FIGS. 6 to 8 show conceptual structures of a storing format for supporting various contents configuration formats like FIG. 1. A basic structure thereof includes an 'ftyp' box, a 'moov' box, and an 'mdat' box. The 'ftyp' box defines a file type. That is, the 'ftyp' box represents a 3D contents file by including a field that represents whether it is a stereoscopic contents file or a monoscopic/stereoscopic contents file. The 'moov' box includes all of system (meta) information for reproducing media data, and the 'mdat' box includes actual media data. It is required to have new supplementary information for stereoscopic contents based on the shown formats, and the structure of the storing format is changed according to the location of the supplementary information.

FIG. 6 shows a structure of a storing format that includes an initial stereoscopic header (ishd) having information on the number of sources forming a 3D content and new supplementary information, which is included in the 'moov' box. A diagram a) of FIG. 6 shows a storing format for 3D contents having one source. As shown in the diagram a), one frame includes both of left image information and right image information (For example: side by side). A diagram b) of FIG. 6 shows a storing format for 3D contents having two sources. As shown in the diagram b), each of left image information and right image information is individually included in a corresponding frame. The number of tracks in the 'moov' box is changed according to the number of included media data. The tracks of the 'moov' box include entire system information (meta information) for reproducing media data included in the 'mdat' box.

Such a storing format needs a structure for new supplementary information and supporting the new supplementary information. In the present embodiment, an initial stereoscopic header (ishd) is newly defined and included in a track of the 'moov' box. The location of the initial stereoscopic header (ishd) may be changed in the 'moov' box or in a storing format.

FIG. 7 shows a storing format structure having an 'mdat' box having information on a newly defined initial stereoscopic header. A diagram a) of FIG. 7 shows a storing format for 3D contents formed of one source, and a diagram b) of FIG. 7 shows a storing format for 3D contents formed of two sources. As shown, the storing format can be embodied by including information that 'ishd' stream is included in the 'mdat' box with the typical structure of the 'moov' box sustained.

FIG. 8 shows a storing format including a 'meta' box having ishd information. A diagram a) of FIG. 8 shows a storing format for 3D contents formed of one source, and a diagram b) of FIG. 8 shows a storing format for 3D contents formed of two sources.

Table 22 shows a structure for informing that ishd information is included in the 'mdat' box. Such a structure is included in an 'stsd' (sample description) box.

TABLE 22

//ishd Sequences
Class ishdsampleEntry(codingname) extends SampleEntry ('ishd') { }

Figure 9:
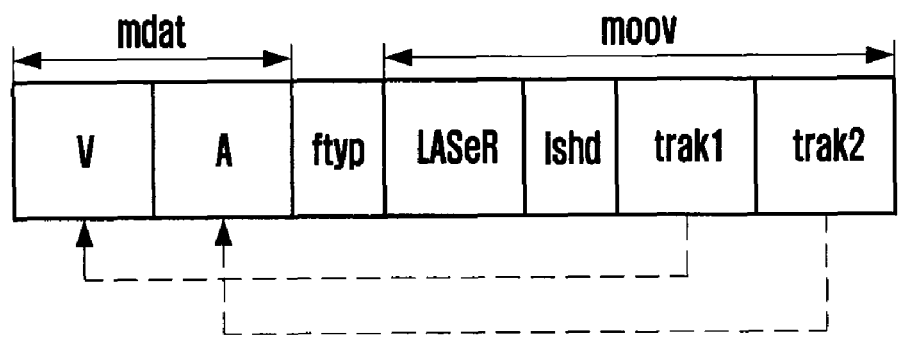
FIG. 9 is a diagram illustrating a format including an 'ishd' box and LASeR in accordance with an embodiment of the present invention.
Figure 9:
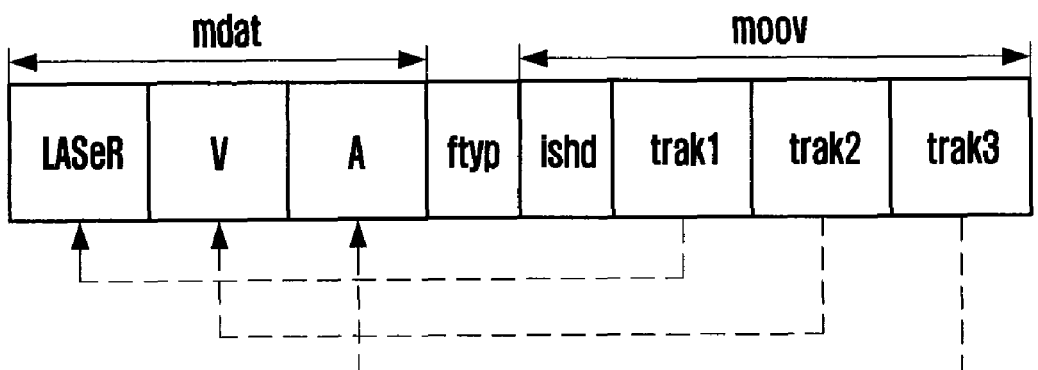

FIG. 9 shows a storing format having information on a scene descriptor based on the structures shown in FIGS. 6 to 8. A scene descriptor is used for scene configurations of various multimedia and interaction with a user. In the present embodiment, LASeR is used as the scene descriptor.

A diagram a) of FIG. 9 shows a storing format including an additional box for storing a scene descriptor stream in a 'moov' box. A diagram b) of FIG. 9 shows a storing format including an 'mdat' box having a scene descriptor stream, a 'moov' box having an additional track for informing that the scene descriptor stream is included in the 'mdat' box, and a 'stsd' box having information on the scene descriptor stream. That is, it relates to searching a 'stsd' box in a track, analyzing which information (scene descriptor/video/audio) is represented by the track, and decoding using information stored in the 'mdat' box based on the analyzing result. A diagram c) of FIG. 9 shows a storing format structure including a 'meta' box having information on a defined scene descriptor.

Table 23 to Table 25 show embodiments of an ishd structure that supports all of 3D content configuration formats of FIG. 1.

TABLE 23

```
Class ishd {
    unsigned int(16) num_MonoStereo_scene;
    if(num_MonoStereo_scene){
        for(i=0;i<num_MonoStereo_scene;i++)
            unsigned int(16)  start_sample_index;
            unsigned int(3)   Composition_type;
            unsigned int(1)   numofES;
            unsigned int(1)   LR_first;
            unsigned int(3)   Reserved;
        }
    } else
    unsigned int(3)   Composition_type;
    unsigned int(1)   numofES;
    unsigned int(1)   LR_first;
    stereoscopicCameraInfo[0...1];
    stereoscopicContentsInfo[0...1];
}
```

TABLE 24

```
Class ishd {
    unsigned int(16) num_MonoStereo_scene;
    if(num_MonoStereo_scene){
        for(i=0;i<num_MonoStereo_scene;i++)
            unsigned int(16)  start_sample_index;
            unsigned int(3)   Composition_type;
            unsigned int(1)   numofES;
            unsigned int(1)   LR_first;
            unsigned int(3)   Reserved;
        }
    } else
    unsigned int(3)   Composition_type;
    unsigned int(1)   numofES;
    unsigned int(1)   LR_first;
}
```

TABLE 25

```
Class ishd {
    unsigned int(16) num_MonoStereo_scene;
    if(num_MonoStereo_scene){
```

TABLE 25-continued

```
         for(i=0;i<num_MonoStereo_scene;i++)
             unsigned int(16) start_sample_index;
             unsigned int(3)  Composition_type;
             unsigned int(1)  numofES;
             unsigned int(1)  LR_first;
             stereoscopicCameraInfo[0...1];
             stereoscopicContentsInfo[0...1];
             unsigned int(3) Reserved;
         }
     } else
         unsigned int(3)  Composition_type;
         unsigned int(1)  numofES;
         unsigned int(1)  LR_first;
         stereoscopicCameraInfo[0...1];
         stereoscopicContentsInfo[0...1];
     }
```

In Table 23 to Table 25, a 'num_MonoStereo_scene' denotes the number of scenes when stereoscopic contents are formed of a 2D content and a 3D content together. The 'num_MonoStereo_scene' also denotes the number of scenes when stereoscopic contents are formed of various 3D contents. For example, stereoscopic contents are formed of a 2D content, a 3D content, and a 2D content [(2D)(3D)(2D)], the Num_MonoStereo_scene becomes 3 (Num_MonoStereo_scene=3). The Num_MonoStereo_scene becomes 2 (num_MonoStereo_scene=2) if the stereoscopic contents is formed in a side by side scheme (field sequential). Furthermore, The Num_MonoStereo_scene becomes 1 (num_MonoStereo_scene=1) if the stereoscopic contents is formed of 3D contents in a single format.

A 'Start_sample_index' may be used as a beginning sample number of each content (that is, a general frame number) or the number of samples included according to each content type. A 'numofES' denotes the number of video streams included in a 'mdat' box.

A 'Composition_type' denotes information for identifying formats of 2D contents and 3D contents. 'Start_sample_index' and 'Compostion_type' may be used as basic information for automatic display on/off at various 3D terminals supporting 2D/3D display modes. The 'Composition_type' has meaning of Table 26.

TABLE 26

| Value | | Description |
|---|---|---|
| 3D | 000 | Side by Side |
|  | 001 | Top-down |
|  | 010 | Field sequential |
|  | 011 | Frame sequential |
|  | 100 | Vertical line interleaved format |
|  | 101 | Left/right image |
| 2D | 110 | Monoscopic left image |
|  | 111 | Monoscopic right image |

A 'LR_first' denotes one having a higher priority between a left image and a right image. That is, the 'LR_first' informs an image encoded first between a left image and a right image.

A 'stereoscopicCameraInfo' object denotes camera parameter information for 3D contents. Table 27 shows an embodiment of the 'stereoscopicCameraInfo' object. The camera parameter information according to the present embodiment may be included in other typical boxes or a box that is newly defined according to an embodiment of the present invention. In Table 27, a 'StereoscopicCamera_setting' denotes camera arrangements when 3D contents is produced or photographed. That is, the 'StereoscopicCamera_setting' denotes one of "parallal" and "cross". A 'Baseline' denotes a distance between stereoscopic cameras, and a 'Focal_Length' denotes a distance from a lens to an image plane. Also, a 'ConvergencePoint_distance' denotes a diagram from a base line connecting a left camera and a left camera to a convergence point.

TABLE 27

```
StereeoscopicCameraInfo {
    unsigned int(1) StereoscopicCamera_setting;
    unsigned int(7) Reserved=1111;
    unsigned int(16) Baseline;
    unsigned int(16) Focal_Length;
    unsigned int(16) ConvergencePoint_distance;
}
```

A 'StereoscopicContentsInfo' object denotes minimum information for displaying 3D contents. Table 28 shows an embodiment of the 'StereoscopicContentsInfo' object. Information included in the 'StereoscopicContentsInfo' can be included in other typical boxes or a box that is newly defined according to the present embodiment. A 'Max_disparity' denotes a maximum disparity size of 3D contents, and a 'Min_disparity' denotes a minimum disparity size of 3D contents.

TABLE 28

```
StereeoscopicContentsinfo {
    unsigned int(16) Max_disparity;
    unsigned int(16) Min_disparity;
}
```

Information in the 'StereoscopicCameraInfo' and 'StereoscopicContentsInfo' may be expressed as additional descriptions such as MPEG-7 metadata and stored.

Figure 10:
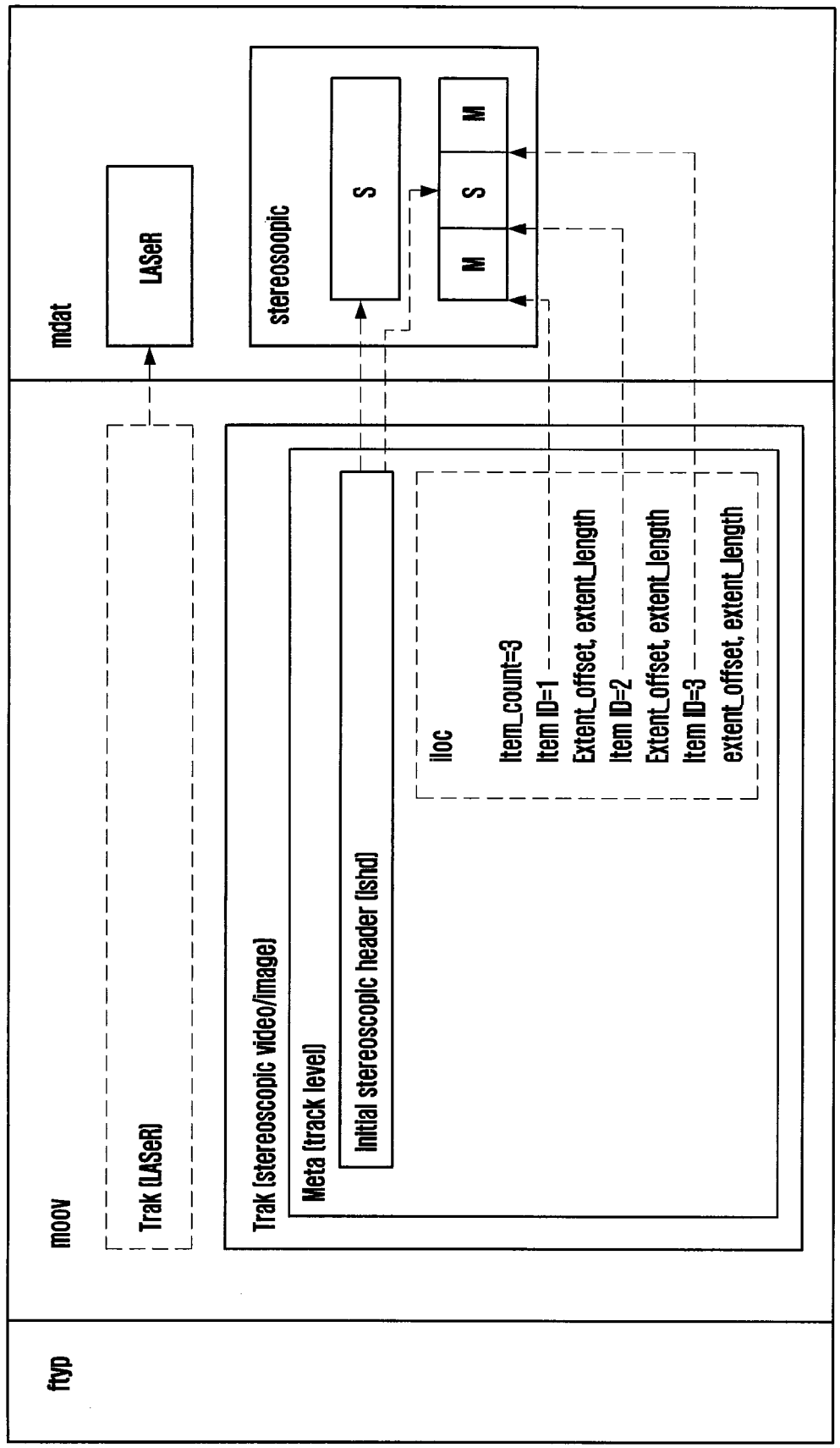
FIG. 10 is a diagram of a SS-VAF including an 'ishd' box and an 'floc' box when ES=1 in accordance with an embodiment of the present invention.

FIG. 10 is a diagram illustrating a SS-VAF in accordance with an embodiment of the present invention when ES=1.

An 'ftyp' box denotes whether a stereoscopic content is included or not. When entire elementary streams are 3D, and when an elementary stream is formed of 2D/3D mixed stream, they are considered as stereoscopic contents.

When a stereoscopic content is formed of 2D/3D streams, beginning information and length information of 2D/3D streams are required. For the beginning information and length information, an 'iloc' box is used, which is a typical box of an ISO based file format (11496-12). The 'iloc' box provides a location of a stereoscopic fragment in a stored file in case of stereoscopic contents.

Information related to distinguish a 2D stream and a 3D stream is obtained through an 'ishd' box. Information related to 3D streams is obtained by referring one 'ishd' information if a plurality of 3D streams are the same information (that is, if it is a single format) although a plurality of 3D streams are included in case of 2D/3D mixed stream.

A stereoscopic data can be expressed using the 'ishd' box without using an 'iloc' box in the stereoscopic contents are formed only of 3D streams of a single format. Also, offset/length values of each format are detected using the 'iloc' box, and format information is obtained through an 'ishd' box if a 3D stream is formed of multiple formats when ES=1. In this case, the 'ishd' box includes information on multiple formats.

Figure 11:
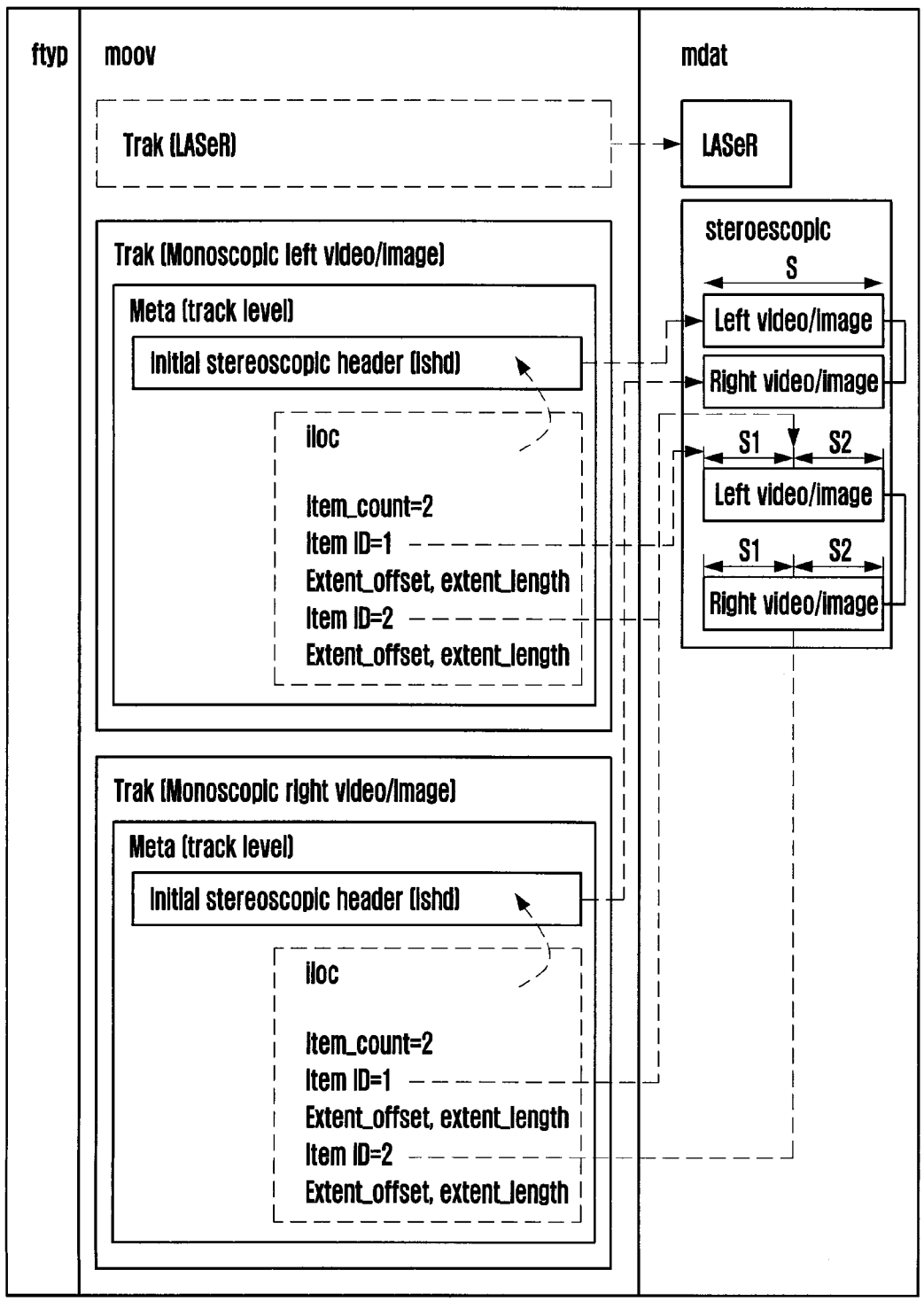
FIG. 11 is a diagram of a SS-VAF including an 'ishd' box and an 'iloc' box in accordance with an embodiment of the present invention.

FIG. 11 is a diagram illustrating a SS-VAF according to an embodiment of the present invention when ES=2. In case of ES=2, left stream information and right stream information are included in a corresponding 'trak' box. Since stereoscopic data is converted into a predetermined format and displayed as described above, the left stream information and the right stream information are formed as two tracks. However, it is required to show relation between a left stream and a right stream in order to let the two tracks to be recognized as one object. For example, if a left image is an main image and a right image is an additional image, it is possible to remove redundancy in an 'ishd' box by expressing relation between a 'trak' box having right image stream information and a 'trak' box having left image stream information. If camera parameter and display information in an 'ishd' included in right image stream information is identical to that an 'ishd' included in the left image stream information, the information included in the 'ishd' in the left image stream information can be used without additional description. In order to express such relation, a 'tref' box and a 'svdp' box are introduced in the present embodiment.

It is required to detect a delimiter, a beginning, and a length of 3D stream corresponding to each format when it is formed of 3D streams of multiple formats on a 3D stream stored as left and right streams. The beginning and the length information are obtained through an 'iloc' box which is a typical box of an ISO based file format (14496-12). Also, information related to the delimiter of a 3D stream of multiple formats is obtained through an 'ishd' box. Table 29 shows the syntax of an 'ishd' box of a single format according to an embodiment of the present invention.

TABLE 29

Aligned(8) class Initial Stereoscopic Header box extend
FullBox('ishd', version=0,0)
    unsigned int(8) Stereoscopic_Composition_Type;
    unsigned int(1) LR_first;
    unsigned int(1) Is_camParams;
    unsigned int(1) Is_disInfo;
    unsigned int(5) Reserved;
    //all the following are optional fields
    if(Is_CamParams){
      unsigned int(32) Baseline;
      unsigned int(32) focallength;
      unsigned int(32) convergence_distance;
      unsigned int(1) Is_camera_cross
    }
    if(Is_camera_cross){
      unsigned int(32) rotation[ ];
      unsgiend int(32) translation[ ];
      unsigned int(7) reserved;
    }
    if(Is_disInfo){
      Int(16) MinofDisparity;
      Int(16) MaxofDisparity;
    }

An 'Is_camParams' denotes whether a camera parameter is present or not, an 'Is_disInfo' denotes whether stereoscopic contents display information is present or not, a 'Bseline' denotes a distance between a left camera and a right camera, a 'focallength' denotes a distance from a lens to an image plane (film), and a 'convergence_distance' denotes a distance from the center of a baseline to a convergence point. The baseline connects a left camera and a right camera and a convergence point is a crossing of sight lines of left and right cameras. The 'convergence_distance' has a value of infinity in case of a parallel axis camera. In order to express it, 1 is assigned to all bits.

Also, the 'Is_camera_cross' denotes a crossing axis camera when the 'Is_camera_cross' is '1', and the 'Is_camera_cross' denotes a parallel axis camera when the 'Is_camera_cross' is '0'. A 'rotation' denotes a camera position angle to an object. A 'translation' denotes whether a stereo camera moves or not (no stereo camera movement when all bits are 0). A 'MinofDisparity' denotes minimum disparity sizes of left and right images, and a 'MaxofDisparity' denotes maximum disparity of left and right images.

Table 30 shows syntax of an 'ishd' box of multiple formats. An 'Item_count' denotes the number of description of information of formats in case of multiple formats. An 'Item_ID' denotes an integer name of each format and is used for identifying various stereoscopic formats in a stereoscopic content. Here, the 'Item_ID' is used with the item_ID of the 'iloc' box.

TABLE 30

Aligned(8) class Initial Stereoscopic Header box extend
FullBox('ishd', version=0,0)
    unsigned int(16) item_count;
    for (i=0; i<item_count; i++) {
    unsigned int(16) item_ID;
    unsigned
int(8) Stereoscopic_Composition_Type;
    unsigned int(1) LR_first;
    unsigned int(1) Is_camParams;
    unsigned int(1) Is_disInfo;
    unsigned int(5) Reserved;
    //all the following are optional fields
    if(Is_CamParams){
      unsigned int(32) baseline;
      unsigned int(32) focallength;
      unsigned int(32) convergence_distance;
      unsigned int(1) Is_camera_cross
    }
    if(Is_camera_cross) {
      unsigned int(32) rotation[ ];
      unsigend int(32) translation[ ];
      unsigned inet(7) reserved;
    }
    if(Is_disInfo){
      Int(16) MinofDisparity;
      Int(16) MaxofDisparity;
    }
    //other additional information
      if(other_flag){ }
    }

Hereinafter, Advanced Video Coding (AVC) and Supplemental enhancement information (SEI) will be described. The SEI includes 'stereo video information SEI' having message information related to decoding and display, and a SEI message is transmitted within an AVC stream.

Figure 12:
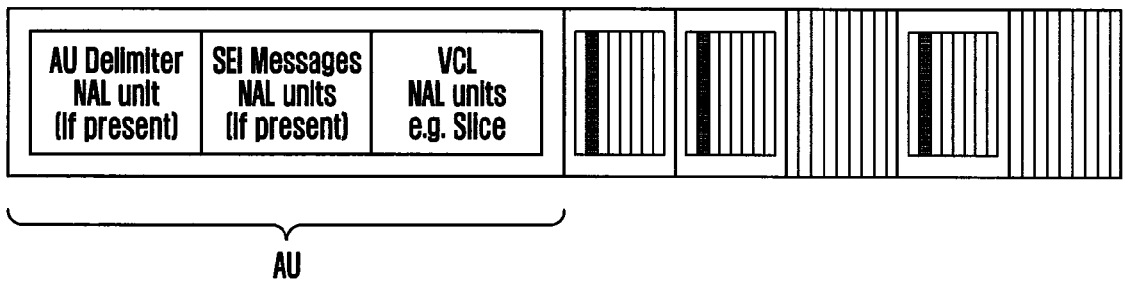
FIG. 12 a) shows a part including 'stereo video information SEI' and 'reserved_sei_message' in a basic structure of SEI in AVC and FIG. 12 b) shows a location of SEI in AVC stream.

FIG. 12 is a flowchart of single video elementary stream containing NAL units. A diagram a) of FIG. 12 shows a part including 'stereo vide information SEI' and 'reserved_sei_message', and a diagram b) of FIG. 12 shows a location of SEI in an AVC stream. Table 31 shows a 'Stereo video information SEI' message.

TABLE 31

| stereo_video_info(payloadSize){ | C | Descriptor |
|---|---|---|
| field_views_flag | 5 | u(1) |
| if(field_views_flag) | | |
|   top_field_is_left_view_flag | 5 | u(1) |
| else { | | |
|   current_frame_is_left_view_flag | 5 | u(1) |
|   next_frame_is_second_view_flag | 5 | u(1) |
| } | | |
| left_view_self_contained_flag | 5 | u(1) |
| right_view_self_contained_flag | 5 | u(1) |
| } | | |

A 'Field_views_flag' denotes whether a field based stereoscopic stream is present or not. A 'Top_field_is_left_view_flag' denotes a stereoscopic content formed in a vertical interlaced format (left view first) when it is '1', and the 'Top_field_is_left_view_flag' denotes a stereoscopic content formed in a vertical line interleaved format (right view first)

when it is '0'. A 'Current_frame_is_left_view_flag' denotes that a current frame represents a left view when it is '1' and denotes that a current frame shows a right view when it is '0'. A 'Next_frame_is_second_view_flag' denotes that a stereoscopic image is formed of a current frame and a next frame when it is '1', and denotes that a stereoscopic image is formed of a current frame and a previous frame when it is '0'. A 'Left_view_self_contained_flag' denotes that a stream is coated as an independent stream without correlation with a right view when it is '1' and denotes that a stream is coated based on correlation with a right view when it is '0'. A 'Right_view_self_contained_flag' denotes that a stream is coated as an independent stream without correlation with a left view when it is '1' and denotes that a stream is coated based on correlation with a left view when it is '0'.

The 'stereo video information SEI' information includes a format of Table 32 among 'stereoscopic_composition_type'. However, a 'side by side' format is not supported.

TABLE 32

| | |
|---|---|
| 1 | Vertical interleaved format |
| 2 | Frame sequential format |
| 3 | Field sequential format |
| 4 | Monoscopic left image |
| 5 | Monoscopic right image |

Hereinafter, a method and a storing format for servicing a stereoscopic content using typical AVC SEI information is introduced. It is possible only when a stereoscopic content is encoded through AVC.

A SS-VAF using a 'reserved_sei_message' is introduced as adding camera parameter and display information required for each stereoscopic stream based on a typical 'stereo video information SEI'. Also, a 'stereo video information SEI' can be extended and used like Table 33. When a 'Side_by_side_flag' is '1', it is formed as a left image and a right image in one frame with the left view first. When the 'Side_by_side_flag' is '0', it is formed as a left image and a right image in one frame with the right view first. In Table 33, "C" denotes a category of syntax, and "u(1)" means an "unsigned integer" using 1-bit.

TABLE 33

| stereo_video_info(payloadSize){ | C | Descriptor |
|---|---|---|
| field_views_flag | 5 | u(1) |
| if(field_views_flag) | | |
|   top_field_is_left_view_flag | 5 | u(1) |
| else { | | |
|   current_frame_is_left_view_flag | 5 | u(1) |
|   next_frame_is_second_view_flag | 5 | u(1) |
| } | | |
| else { | | |
|   left_view_self_contained_flag | 5 | u(1) |
|   right_view_self_contained_flag | 5 | u(1) |
| } | | |
|   side_by_side_flag | 5 | u(1) |
| } | | |

Table 34 defines stereoscopic camera information using 'reserved_sei_message(playloadSize) among SEI information of AVC. Here, other camera information may be added. The added information may be independently used. Based on this, camera parameter information for a stereoscopic contents stream can be obtained.

TABLE 34

| stereo_camera_info(payloadSize) { | C | Descriptor |
|---|---|---|
| if(Is_CamParams){ | | |
|   baseline; | 5 | U(32) |
|   focallength; | 5 | U(32) |
|   convergence_distance; | 5 | U(32) |
|   if(Is_camera_cross) { | | |
|     rotation[ ]; | 5 | U(32) |
|     translation[ ]; | 5 | U(32) |
|   } | | |
| } | | |

Table 35 defines information for displaying stereoscopic contents using 'reserved_sei_message (payloadSize)' among SEI information of AVC. Based on the information defined in Table 35, a stereoscopic contents disparity value is extracted.

TABLE 35

| stereo_display_info(payloadSize) { | C | Descriptor |
|---|---|---|
| if(Is_disInfo){ | | |
|   MinofDisparity; | 5 | U(16) |
|   MaxofDisparity; | 5 | U(16) |
| } | | |

However, it is possible to provide stereo camera and display information by combining the above information into one SEI_message.

Figure 13:
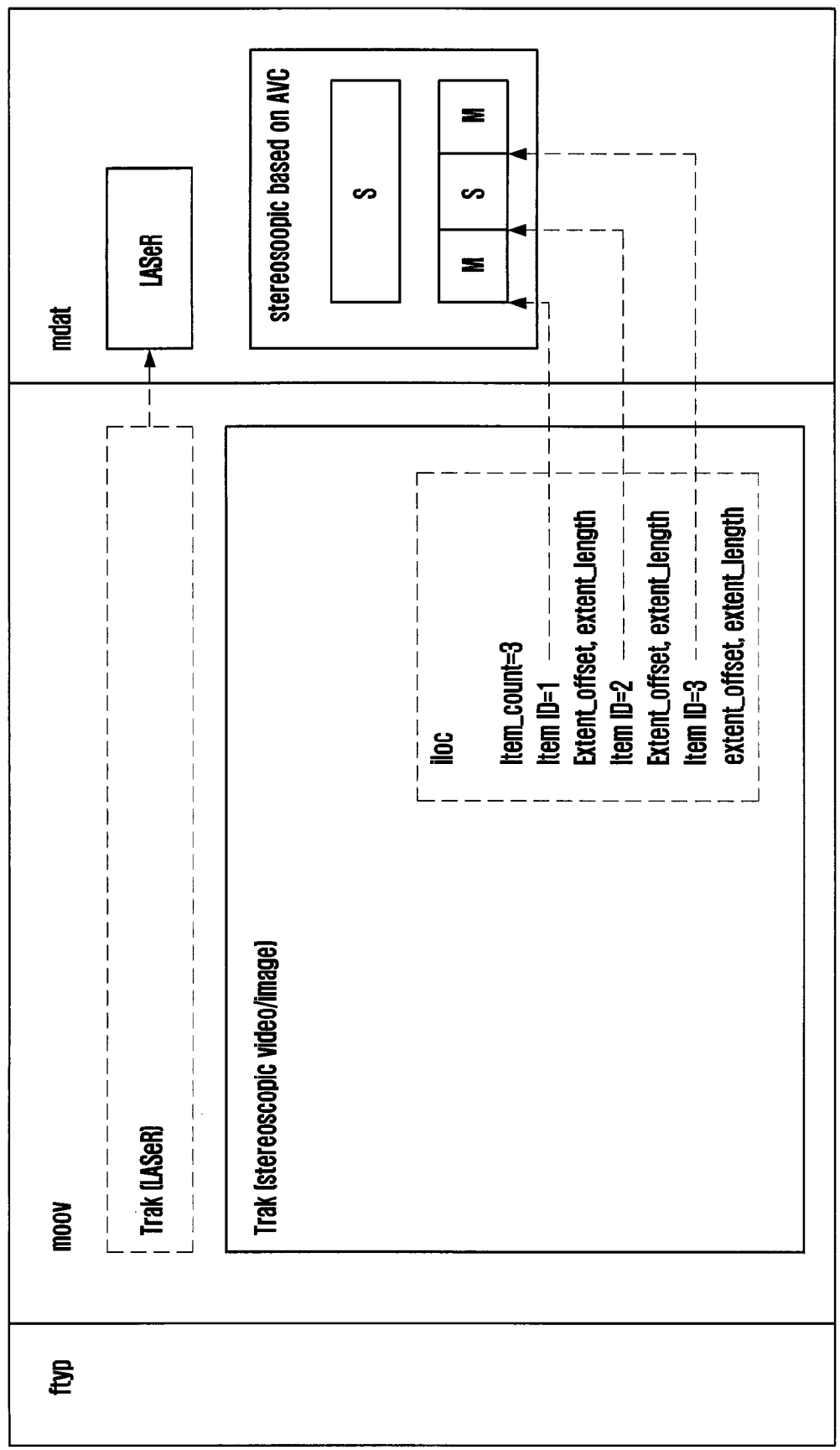
FIG. 13 is a diagram illustrating a SS-VAF using 'stereo video information SEI' and 'reserved_sei_message' in accordance with an embodiment of the present invention.

FIG. 13 is a diagram illustrating an SS-VAF using stereo video information and reserved SEI. LASeR is selectively included in the shown application format.

In a case that stereoscopic contents are formed of 2D/3D mixed streams, 3D stream information defined in an AVC stream SEI message is obtained during a 3D stream fragment through an 'iloc' box. Here, the 3D stream information may include 'stereo video information SEI', 'stereo camera information SET', and 'stereo display information SEI'. In a case that stereoscopic contents are formed of only 3D streams of a single format, the stereoscopic contents can be expressed using 3D stream information defined in an AVC stream SEI message. Here, the 3D stream information may include 'stereo video information SEI', 'stereo camera information SET', and 'stereo display information SET'.

Figure 14:
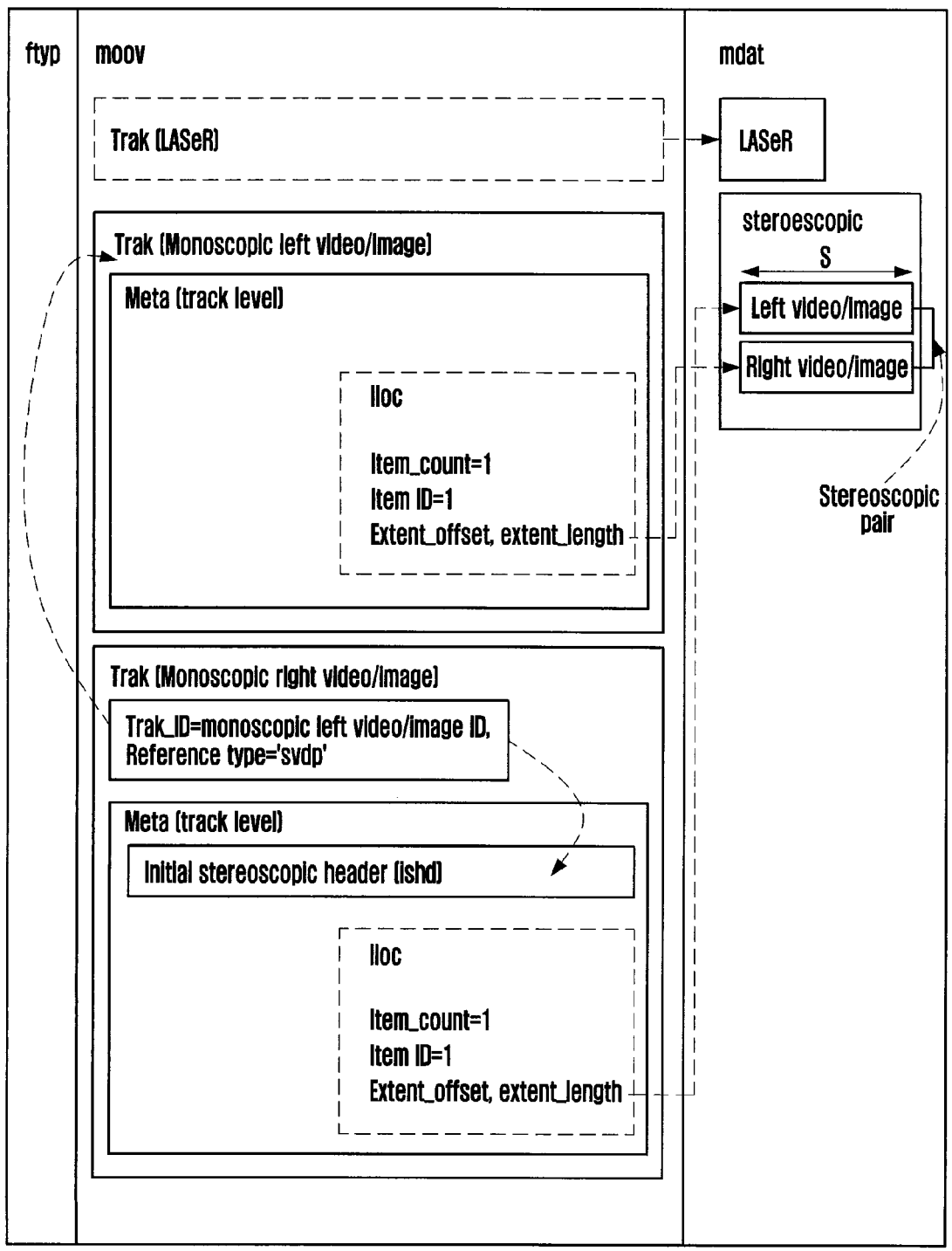
FIG. 14 is a diagram illustrating a SS-VAF having 'tref', 'ishd', and 'iloc' boxes according to an embodiment of the present invention in a case that contents are formed only of single format stereoscopic streams when ES=2.

FIG. 14 is a diagram illustrating a SS-VAF when stereoscopic contents include two elementary streams (ES) and are formed of only single format stereoscopic streams. In case of ES=2, left stream information and right stream information are included each corresponding 'trak'. Here, it is necessary to show relation between the left and right streams. For example, it is possible to remove redundancy of the 'ishd' information by showing relation between a 'trak' box including right image stream information and another 'trak' box including left image stream information if a left image is a main image and a right image is a supplementary image. Such relation uses a 'tref' box included in an ISO based file format. It allows all of trak_IDs necessary for reproducing to be described. Therefore, all of trak_IDs are described with 'tref' in 'trak' in a right image stream (supplementary image).

Table 36 shows the syntax of an 'ishd' box in case of supporting various stereoscopic configuration formats and camera parameters according to an embodiment of the present invention. An 'item_ID' denotes an ID of an item defining next information and has a value larger than 1. A 'current_indicator' denotes validity of information described next when it is '1' and denotes that previously described information is identical to information described next when it is '0'. However, if item_ID=1, it means that there is no information that will be described next. That is, a terminal determines validity of information that will be described next based on the 'Current_indicator' and determines that it is identical to 'ishd' information described previously when it is 0.

Also, an 'LR_first' denotes reference location selection of a left image and a right image. An 'Is_camParams' denotes whether a camera parameter is present or not. An 'Is_displaySafeInfo' denotes whether stereoscopic contents display information is present or not. A 'Baseline' denotes a distance between a left camera and a right camera. A 'focallength' denotes a distance from a CCD to an image plane (film). An 'Is_camera_cross' denotes a cross axis camera when it is '1', and denotes a parallel axis camera when it is '0'.

TABLE 36

```
Aligned(8) class Initial Stereoscopic Header box extend
FullBox('ishd', version=0,0)
        unsigned int(16)  item_ID;
        unsigned int(1)   current_indicatior;
        unsigned int(8)   Stereoscopic_Composition_Type;
        unsigned int(1)   LR_first;
        unsigned int(1)   Is_camParams;
        unsigned int(1)   Is_displaySafeInfo;
        unsigned int(4)   Reserved;
        //all the following are optional fields
        if(Is_CamParams){
                unsigned int(32) baseline;
                unsigned int(32)    focallength;
                unsigned int(1)     Is_camera_cross
                if(Is_camera_cross) {
                        unsigned
int(32)   convergence_distance;
                        unsigned int(32)    rotation[ ];
                        unsgiend int(32) translation[ ];
                        unsigned int(7)    reserved;
        }
        if(Is_displaySafeInfo){
unsigned int(16) ViewingDisatance;
            int(16)     VerticalDisparity;
            int(16)     MinofDisparity;
            Int(16)     MaxofDisparity;
        }
        //other additional information
        if(other_flag){ }
        aligned(8) class Initial Stereoscopic Header box
extend FullBox('ishd', version=0,0){
                unsigned int(16)   item_count;
                ishdEntry[item_count] ishds;
        }
```

Furthermore, a 'convergence_distance' denotes a distance from the center of the baseline to a convergence point (The 'convergence_distnace' has an infinite value in case of a parallel camera. When all of bits are 1, it denotes an infinite distance.) A 'rotation' denotes a camera position angle for an object, and a 'translation' denotes movement of a stereo camera (when all of bits are 0, it denotes no stereo camera movement). Also, a 'VerticalDisparity' denotes a vertical disparity size of left and right images, a 'MinofDisparity' denotes an minimum horizontal disparity size of left and right images, a 'MaxofDisparity' denotes a minimum disparity size of left and right images, and an 'item_count' denotes the number of entries in the next array.

Table 37 shows the syntax of an 'ishd' box for supporting various camera parameters according to the first embodiment of the present invention. Here, if the stereoscopic configuration formats are the same, right previous 'ishd' information is referred. Also, camera parameter and display information included in the 'ishd' can be separated to additional boxes and stored.

TABLE 37

```
Aligned(8) class Initial Stereoscopic Header box extend
FullBox('ishd', version=0,0)
        unsigned int(16)  item_ID;
        unsigned int(8)   Stereoscopic_Composition_Type;
        unsigned int(1)   LR_first;
        unsigned int(1)   current_indicatior;
        unsigned int(1)   Is_camParams;
        unsigned int(1)   Is_displaySafeInfo;
        unsigned int(4)   Reserved;
        //all the following are optional fields
        if(Is_CamParams){
                unsigned int(32) baseline;
                unsigned int(32) focallength;
                unsigned int(1)  Is_camera_cross
                if(Is_camera_cross){
                        unsigned
int(32)   convergence_distance;
                        unsigned int(32)    rotation[ ];
                        unsgiend int(32) translation[ ];
                {
                        unsigned int(7)    reserved;
        }
        if(Is_displaySafeInfo){
            unsigned int(16) ViewingDisatance;
            int(16)    VerticalDisparity;
            int(16)    MinofDisparity;
            int(16)    MaxofDisparity;
        }
        //other additional information
        if(other_flag){ }
        aligned(8) class Initial Stereoscopic Header box extend
FullBox('ishd', version=0,0){
            unsigned int(16)   item_count;
            ishdEntry[item_count] ishds;
        }
```

Table 38 shows the syntax of an 'ishd' box supporting various camera parameters according to a second embodiment of the present invention. It is assumed that a stereoscopic configuration format is identical and right previous 'ishd' is referred.

TABLE 38

```
Aligned(8) class Initial Stereoscopic Header box extend
FullBox('ishd', version=0,0)
        unsigned int(8)   Stereoscopic_Composition_Type;
        unsigned int(1)   LR_first;
        unsigned int(7)   Reserved;
        unsigned int(16)  item_count;
        for(i=0; i<item_count;i++) {
            unsigned int(16)  item_ID;
            unsigned int(1)   current_indicatior;
            unsigned int(1)   Is_camParams;
            unsigned int(1)   Is_displaySafeInfo;
            unsigned int(5)   Reserved;
        //all the following are optional fields
        if(Is_CamParams){
            unsigned int(32) baseline;
            unsigned int(32) focallength;
            unsigned int(1)  Is_camera_cross
            unsigned int(7)  reserved;
            if(Is_camera_cross){
                unsigned int(32) convergence_distance;
                unsigned int(32) rotation[ ];
                unsgiend int(32) translation[ ];
            }
        }
        if(Is_displaySafeInfo){
            unsigned int(16) ViewingDisatance;
            int(16)  VerticalDisparity;
            int(16)  MinofDisparity;
            int(16)  MaxofDisparity;
        }
```

TABLE 38-continued

```
    //other additional information
        if(other_flag){ }
}
```

Table 39 shows the syntax of an 'ishd' box supporting various camera parameters according to a third embodiment of the present invention. It is assumed that a stereoscopic configuration format is identical, and a predetermined Item_ID such as 'cameParams' and 'displaysafeInfo' is referred.

In Table 39, an 'Is_ref' denotes there is no referred camera parameter and display information when it is '0' and denotes there is referred Item_ID when it is '1'. A 'current_refIndex' denotes a referred Item_ID.

TABLE 39

```
Aligned(8) class Initial Stereoscopic Header box extend
FullBox('ishd', version=0,0)
        unsigned
int(8)          Stereoscopic_Composition_Type;
        unsigned int(1)     LR_first;
        unsigned int(7)     Reserved;
        unsigned int(16)    item_count;
        for(i=0; i<item_count;i++) {
            unsigned int(16) item_ID;
            unsigned int(1)  Is_camParams;
            unsigned int(1)  Is_displaySafeInfo;
            unsigned int(1)  Is_ref;
            unsigned int(5)  Reserved;
            //all the following are optional fields
            If(Is_ref){
unsigned int(16) current_refIndex;
        }
        else{
            if(Is_CamParams){
                unsigned int(32) baseline;
                    unsigned int(32)    focallength;
                    unsigned int(1)     Is_camera_cross
                    unsigned int(7)     reserved;
            }
            if(Is_camera_cross) {
                unsigned int(32)    convergence_distance;
                unsigned int(32)    rotation[ ];
                unsgiend int(32)    translation[ ];
            }
            if(Is_displaySafeInfo){
                unsigned int(16) ViewingDisatance;
                int(16)     VerticalDisparity;
                int(16)     MinofDisparity;
                int(16)     MaxofDisparity;
            }
        }
    }
    //other additional information
        if(other_flag){ }
}
```

Table 40 shows the syntax of an 'ishd' box supporting various camera parameters according to a fourth embodiment of the present invention. It is assumed that a stereoscopic configuration format is identical, and 'cameParams' and 'displaysafeInfo' refers different Item_IDs.

TABLE 40

```
Aligned(8) class Initial Stereoscopic Header box extend
FullBox('ishd', version=0,0)
        unsigned int(8) Stereoscopic_Composition_Type;
        unsigned int(1) LR_first;
        unsigned int(7) Reserved;
        unsigned int(16) item_count;
```

TABLE 40-continued

```
        for(i=0; i<item_count;i++) {
            unsigned int(16) item_ID;
            unsigned int(1)     Is_camParams;
            unsigned int(1)     Is_displaySafeInfo;
            unsigned int(1)     Is_camParamsref;
            unsigned int(1)     Is_displaySafeInforef;
            unsigned int(4) Reserved;
        //all the following are optional fields
            If(Is_camParamsref || Is_displaySafeInforef){
                unsigned int(16) current_camrefIndex;
                unsigned int(16) current_displayrefIndex;
            }
            else{
                if(Is_CamParams) {
                    unsigned int(32) baseline;
                        unsigned int(32) focallength;
                        unsigned int(1) Is_camera_cross
                    unsigned int(7) reserved;
                    if(Is_camera_cross) {
                        unsigned int(32) convergence_distance;
                        unsigned int(32) rotation[ ];
                        unsgiend int(32) translation[ ];
                    }
                    if(Is_displaySafeInfo){
                        unsigned int(16) ViewingDisatance;
                        int(16)     VerticalDisparity;
                        int(16)     MinofDisparity;
                        int(16)     MaxofDisparity;
                    }
                }
            }
        //other additional information
            if(other_flag){ }
        }
```

In Table 40, an 'Is_camParamsref' denotes there is not camera parameter information referred when it is '0', and denotes there is Item_ID referred when it is '1'. An 'Is_displaySafeInforef' denotes there is no display safe information referred when it is '0', and denotes there is an Item_ID referred when it is '1'. A 'current_cameraIndex' denotes an Item_ID referred, and a 'Current_displayIndex' denotes a referred Item_ID.

The 'ishd' box may be divided into a 'svmi' box (stereoscopic video media information box) for recording stereoscopic video media information and a 'scdi' box (Stereoscopic Camera and Display Information box) for recording camera parameters and display information. Since the 'svmi' box is mandatory and the 'scdi' box is not mandatory, it is advantage to divide the 'ishd' box into the 'svmi' box and the 'scdi' box in order to remove unnecessary information.

The 'svmi' box provides a stereoscopic visual type and fragment information. In more detail, the stereoscopic video media information includes information on a stereoscopic image configuration type, information on a first encoded image between a left image and a right image, information on the number of fragments when an elementary stream of stereoscopic contents is changed from a stereoscopic fragment to a monoscopic fragment or from a monoscopic fragment to a stereoscopic fragment, information on the number of consecutive samples or counting a beginning sample number, and information on whether a current sample is stereoscopic or not.

The 'scdi' box includes information on whether a camera parameter is present or not, a distance between a left camera and a right camera, the arrangement of left and right cameras, a comparative angle from a main view camera to a sub view camera, and a maximum disparity and a minimum disparity between a left image and a right image. Table 41 shows the syntax of the 'scdi' box according to an embodiment of the present invention.

TABLE 41

```
unsigned int(16) item_count;
    for(i=0; i<item_count;i++) {
        unsigned int(16) item_ID;
        unsigned int(1)   Is_camParams;
        unsigned int(1)   Is_displaySafeInfo;
        unsigned int(1)   Is_ref;
        unsigned int(5) Reserved;
    //all the following are optional fields
        If(Is_ref){
            unsigned int(16)     current_refIndex;
        }
        else{
            if(Is_CamParams){
                unsigned int(32)  baseline;
                unsigned int(32)  focallength;
                unsigned int(1)   Is_camera_cross
                unsigned int(7)   reserved;
            }
            if(Is_camera_cross) {
                unsigned int(32)  convergence_distance;
                unsigned int(32)  rotation[ ];
                unsgiend int(32)  translation[ ];
            }
            if(Is_displaySafeInfo){
                unsigned int(16) ViewingDisatance;
                int(16)       VerticalDisparity;
                int(16)       MinofDisparity;
                int(16)       MaxofDisparity;
            }
        }
    }
```

As shown, it is possible to remove redundancy of 'scdi' information included in each track through the 'tref' box (Track reference box). When ES=2, an 'iloc' box of each track divides stereoscopic fragments in order to provide the 'scdi' information. Here, a stereoscopic fragment of each track has the same item_ID and identical camera parameter and display information. An elementary stream is divided into main/supplementary tracks through the 'svdp' of the 'tref'. Although an 'iloc' box is included in only one track, it is possible to reproduce it through synchronizing the 'floc' box by a stereoscopic fragment when 3D display is performed.

It is also possible to remove the redundancy of the same stereoscopic video media information ('svmi') included in each track through a 'tref' box. After stereoscopic contents are recognized through the 'ftyp' box, main/supplementary tracks are divided through the 'svdp' box of the 'tref' box. If one track includes the 'svmi' box, another track can be automatically recognized. Since the 'svmi' box is mandatory, it may be included in main/supplementary tracks. The 'svmi' box may be included only in a main track.

Figure 15:
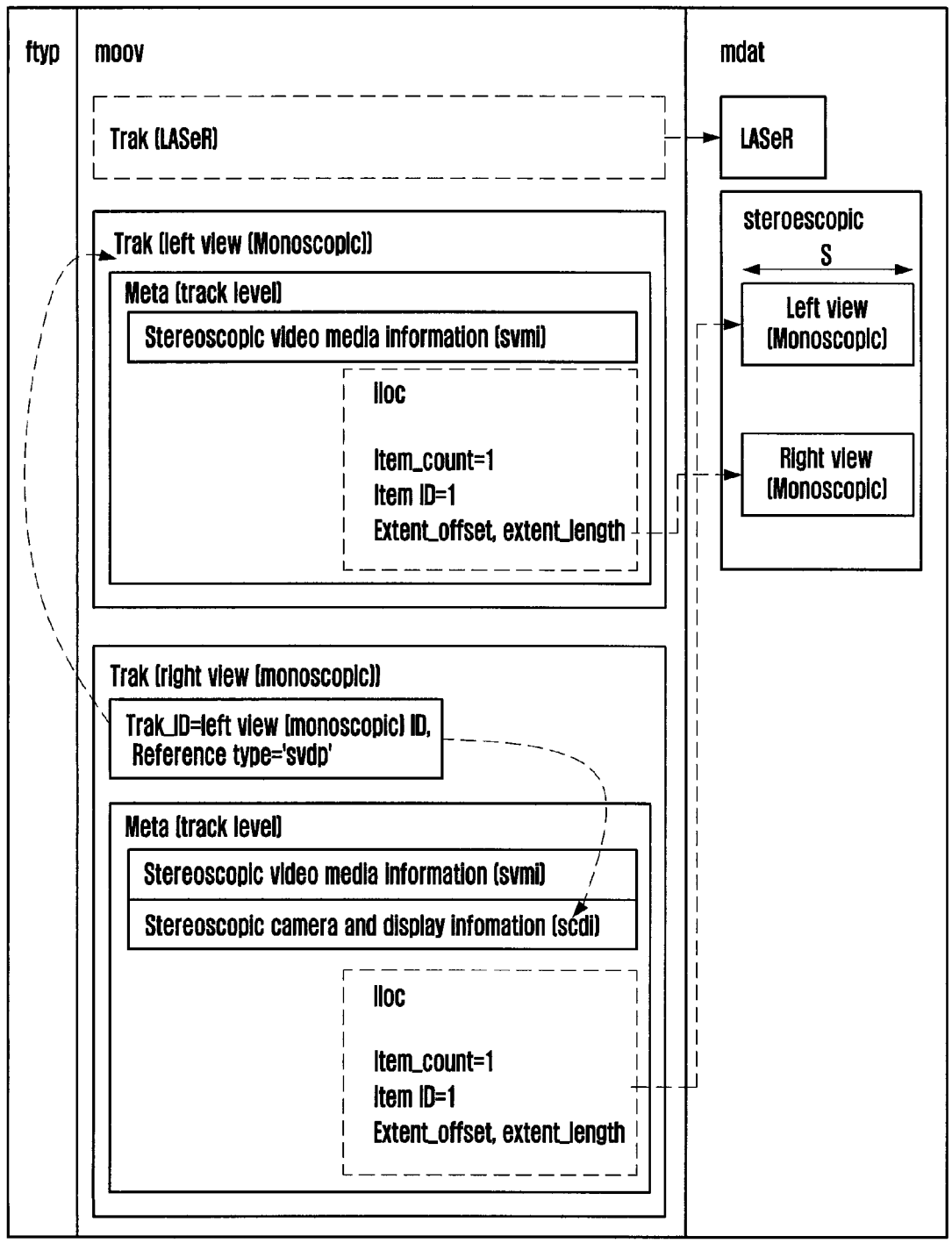
FIG. 15 is a diagram illustrating a SS-VAF having 'tref', 'ishd', and 'iloc' boxes according to an embodiment of the present invention.

FIG. 15 is a diagram illustrating a SS-VAF when ES=2 according to an embodiment of the present invention. As shown in FIG. 15, the SS-VAF includes a 'svmi' box and a 'scdi' box.

When a stereoscopic content includes two elementary streams (ES), two tracks ('trak') are included. It can be divided into a main track and a supplementary track. Therefore, the main track is referred using the 'svdp' of the 'tref' in the supplementary track, and information included in related 'scdi' information is provided. Such a structure has an advantage of removing the redundancy of the same 'scdi' information included in each track. Here, a track_ID denotes an ID of a referred track. If a reference_type is 'svdp', it also denotes that a track includes stereoscopic camera and display information for a reference track.

When a user changes a 3D display mode to a 2D display mode while the user is watching a predetermined image with the 3D display mode, the 2D display mode is satisfied by displaying images corresponding to the main track at a terminal. Meanwhile, same monoscopic data may be present in the middle of the elementary stream in a track having two elementary streams. In the monoscopic data, the same contents are stored in two tracks. Therefore, the monoscopic data is data that cannot be displayed as 3D. In this case, a terminal must decide one of the two tracks to display monoscopic data of thereof. The terminal displays images corresponding to the main track divided according to the present embodiment.

When elementary streams of a stereoscopic video are two, two tracks are present. The stereoscopic video is recognized as two objects by a scene descriptor such as conventional LASeR, and the stereoscopic video is connected to two video related nodes in LASeR. However, the stereoscopic video must be converted to one 3D video format and reproduced in a terminal, finally. Therefore, it must be recognized as one object by LASeR. That is, since it is required to convert the stereoscopic video to one 3D video format for reproducing scene of the stereoscopic video, it is connected with one node used. According to the present embodiment, the stereoscopic video is divided into main/supplementary tracks using the 'svdp' in the 'tref', and a video related node in LASeR links only a 'trak'_ID corresponding to the main track or media streams.

FIG. 16 is a flowchart illustrating a method for storing a stereoscopic as an ISO based media file format according to an embodiment of the present invention. At first, a target stereoscopic content is stored in an 'mdat' box of an ISO based media file format at step S1602. Then, stereoscopic video media information and stereoscopic camera and display information of the stereoscopic contents are stored in a 'moov' box as metadata of the stereoscopic contents at steps S1604 and S1606.

FIG. 17 is a flowchart illustrating a method for storing a stereoscopic content in an ISO based media file format in accordance with another embodiment of the present invention. At first, a target stereoscopic content is stored in an 'mdat' box of an ISO based media file format at step S1702. Then, if the stereoscopic content includes two elementary streams, information ('svdp') for dividing elementary streams into a main track and a supplementary track is stored in a 'tref' box of an ISO based media file format at step S1704. Then, LASeR for the stereoscopic content having a video related node linked only to the main track is stored at step S1706. Here, a part linked to LASeR is not used, and only 'tref' is used.

FIG. 18 is a flowchart illustrating a method for storing stereoscopic contents in accordance with another embodiment of the present invention. Here, a stereoscopic content is stored using AVC SEI as described above. At first, a stereoscopic content encoded through AVC is stored at step S1802. Then, camera parameter and display information required to each stream of the stereoscopic content is stored using 'reserved_sei_message' at step S1804.

Here, 'stereo video information SEI' additionally includes information denoting that a stereoscopic image configuration is a 'side by side' type. The camera parameter includes at least one of a distance between a left camera and a right camera, a left and right identical focal length (focal_length), a distance from a baseline to a convergence point, rotation and translation of left and right cameras when the left and right cameras cross each other. The display information includes a maximum disparity and a minimum disparity between a left image and a right image.

MODE FOR THE INVENTION

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A non-transitory computer readable storage medium, comprising programmed instructions for:
receiving reference information of first elementary stream and second elementary stream forming the stereoscopic contents; and
storing the reference information in a file structure including reference information area to store the reference information,
wherein the reference information includes relation information which defines reference relation of the first elementary stream and the second elementary stream, which includes tracks identified as a main track and a supplementary track.

2. The non-transitory computer readable storage medium of claim 1, wherein the file structure further includes contents area to store the first elementary stream and the second elementary stream.

3. The non-transitory computer readable storage medium of claim 1, wherein the file structure is a structure based on an international organization for standardization (ISO) based media file format.

4. The non-transitory computer readable storage medium of claim 1, wherein the first elementary stream and the second elementary stream include a monoscopic fragment and wherein the reference information includes information which defines elementary stream to be displayed between the first elementary stream and the second elementary stream when the monoscopic fragment is displayed.

5. The non-transitory computer readable storage medium of claim 1, wherein the stereoscopic contents are formed as a left view sequence and a right view sequence and wherein the left view sequence forms the first elementary stream and the right view sequence forms the second elementary stream.

6. The non-transitory computer readable storage medium of claim 1, further comprising programmed instructions for:
receiving stereoscopic video media information which includes fragment information of the stereoscopic contents; and
storing the stereoscopic video media information in the file structure which further includes video media information area to store the stereoscopic video media information.

7. The non-transitory computer readable storage medium of claim 1, further comprising programmed instructions for:
receiving stereoscopic camera and display information for the stereoscopic contents; and
storing the stereoscopic camera and display information in the file structure which further includes camera and display information area to store the stereoscopic camera and display information.

8. The non-transitory computer readable storage medium of claim 7, wherein the stereoscopic camera and display information includes at least one among the number of stereoscopic fragments to provide camera and display information on a stereoscopic fragment, an item ID for identifying the stereoscopic fragment, and information on whether there is a reference to the item ID.

9. The non-transitory computer readable storage medium of claim 1, further comprising programmed instructions for:
storing scene description information for the stereoscopic contents including a video related node linked to predetermined stream between the first elementary stream and the second elementary stream.

10. The non-transitory computer readable storage medium of claim 9, wherein the video related node is linked to an ID or media stream corresponding to the predetermined stream.

11. The non-transitory computer readable storage medium of claim 1, further comprising programmed instructions for defining a box in an International Organization for Standardization (ISO) based file format that enables the second elementary stream to reference the redundant display information in the first display track.

12. A non-transitory computer readable storage medium having:
a file format structure for storing stereoscopic contents:
a media data box for storing streams of the stereoscopic contents; and
a track reference box for when the stereoscopic contents include more than two elementary streams, storing information dividing the elementary streams into a main track and a supplementary track, and
programmed instructions for removing redundancies of stereoscopic content included in the main and supplementary tracks by removing the redundant stereoscopic content from the supplementary track in the media data box and including in the track reference box a reference to the redundant stereoscopic content in the main track.

13. A non-transitory computer readable storage medium for storing stereoscopic contents based on Advanced Video Codec (AVC) Supplemental Enhancement Information (SEI), the non-transitory computer readable storage medium comprising instructions for:
storing stereoscopic contents encoded based on AVC,
wherein 'stereo video information SEI' includes information indicating that stereoscopic video is of a 'side by side' type; and
storing camera parameter and display information required for each stream of the stereoscopic contents based on 'reserved_sei_message', wherein redundancies of stereoscopic content included in the stereoscopic contents are removed by removing redundant display information from a first track and including a reference to the redundant display information contained in a second track.

14. The non-transitory computer readable storage medium of claim 13, wherein the camera parameter and display information includes at least one among information whether there is display parameter, information whether there is camera parameter, information on camera movement, information on a distance from a lens to an image plane, information on a distance from a base line to a convergence point, and information on camera arrangements and includes information on maximum disparity or minimum disparity between left and right images.

* * * * *